United States Patent
Kobayashi et al.

(10) Patent No.: US 8,050,163 B2
(45) Date of Patent: Nov. 1, 2011

(54) OPTICAL DISC MANUFACTURING METHOD AND DEVICE, OPTICAL DISC, AND OPTICAL DISC REPRODUCTION METHOD

(75) Inventors: Seiji Kobayashi, Kanagawa (JP); Goro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 947 days.

(21) Appl. No.: 11/718,466

(22) PCT Filed: Oct. 24, 2005

(86) PCT No.: PCT/JP2005/019521
§ 371 (c)(1),
(2), (4) Date: Jan. 29, 2008

(87) PCT Pub. No.: WO2006/049029
PCT Pub. Date: May 11, 2006

(65) Prior Publication Data
US 2009/0067309 A1    Mar. 12, 2009

(30) Foreign Application Priority Data
Nov. 2, 2004  (JP) .................................. 2004-319559

(51) Int. Cl.
G11B 7/00 (2006.01)
(52) U.S. Cl. ................. 369/59.11; 369/59.23; 369/53.2; 369/53.22; 369/116
(58) Field of Classification Search .................. None
See application file for complete search history.

(56) References Cited

U.S. PATENT DOCUMENTS

| | | | | |
|---|---|---|---|---|
| 6,631,359 B1 * | 10/2003 | Braitberg et al. | ............... | 705/50 |
| 7,092,342 B2 * | 8/2006 | Nagai et al. | ................. | 369/59.25 |
| 2006/0104190 A1 * | 5/2006 | Babinski | .................... | 369/275.1 |

FOREIGN PATENT DOCUMENTS

| | | |
|---|---|---|
| JP | 8 124219 | 5/1996 |
| JP | 9 128890 | 5/1997 |
| JP | 2003 141742 | 5/2003 |
| JP | 2003 141821 | 5/2003 |
| JP | 2003 151145 | 5/2003 |
| JP | 2003 196836 | 7/2003 |
| JP | 2003 196837 | 7/2003 |
| JP | 2005 310269 | 11/2005 |
| JP | 2005 310270 | 11/2005 |
| JP | 2006 4541 | 1/2006 |

* cited by examiner

*Primary Examiner* — Muhammad N Edun
(74) *Attorney, Agent, or Firm* — Oblon, Spivak, McClelland, Maier & Neustadt, L.L.P.

(57) ABSTRACT

According to the present invention, there is provided a method of recording a unique ID to a read-only optical disc based on the 17PP modulation. The read-only optical disc (1) has set thereon a specific physical cluster to which a unique ID is to be recorded. With user data to be recorded to the specific physical cluster being made all zero (0), a pit/land pattern is formed, and a molding machine using a molding die is used to form many optical discs in the common manner. Thereafter, an ID unique to each optical disc is generated, and a land in a predetermined position in the specific physical cluster is transited to a pit by irradiating high-power laser light to the land correspondingly to the bit information, so that the pit/land pattern will comply the 17PP modulation rule even after the transition of the land to the pit.

72 Claims, 28 Drawing Sheets

| Physical cluster 496*1932cbs | Linking 1932cbs | Linking 1932cbs | Physical cluster 496*1932cbs | Linking 1932cbs | Linking 1932cbs | Physical cluster 496*1932cbs |

| data bits | modulation bits |
|---|---|
| 00 00 00 00 | 010 100 100 100 |
| 00 00 10 00 | 000 100 100 100 |
| 00 00 00 | 010 100 000 |
| 00 00 01 | 010 100 100 |
| 00 00 10 | 000 100 000 |
| 00 00 | 000 100 100 |
| 00 01 | 000 100 |
| 00 10 | 010 000 |
| 00 11 | 010 100 |
| 01 | 010 |
| 10 | 001 |
| 11(xx1-) | 000 |
| (xx0-) | 101 |
| 11 01 11 | 001 000 000 |
| 00 00 (-fs) | 010 100 |
| 00 (-fs) | 000 |

| sync-N | sync | sync-ID |
|---|---|---|
| FS0 | #01 010 000 000 010 000 000 010 | 000 001 |
| FS1 | #01 010 000 000 010 000 000 010 | 010 010 |
| FS2 | #01 010 000 000 010 000 000 010 | 101 000 |
| FS3 | #01 010 000 000 010 000 000 010 | 100 001 |
| FS4 | #01 010 000 000 010 000 000 010 | 000 100 |
| FS5 | #01 010 000 000 010 000 000 010 | 001 001 |
| FS6 | #01 010 000 000 010 000 000 010 | 010 000 |
| FS7 | #01 010 000 000 010 000 000 010 | 100 000 |
| FS8 | #01 010 000 000 010 000 000 010 | 101 010 |

FIG.12

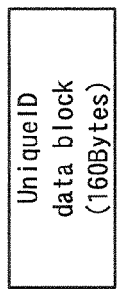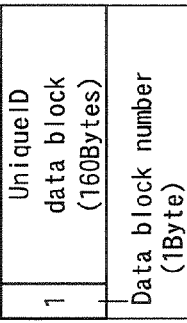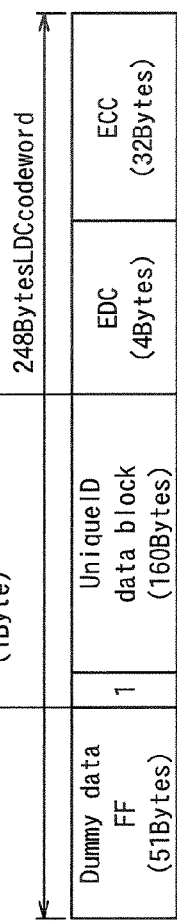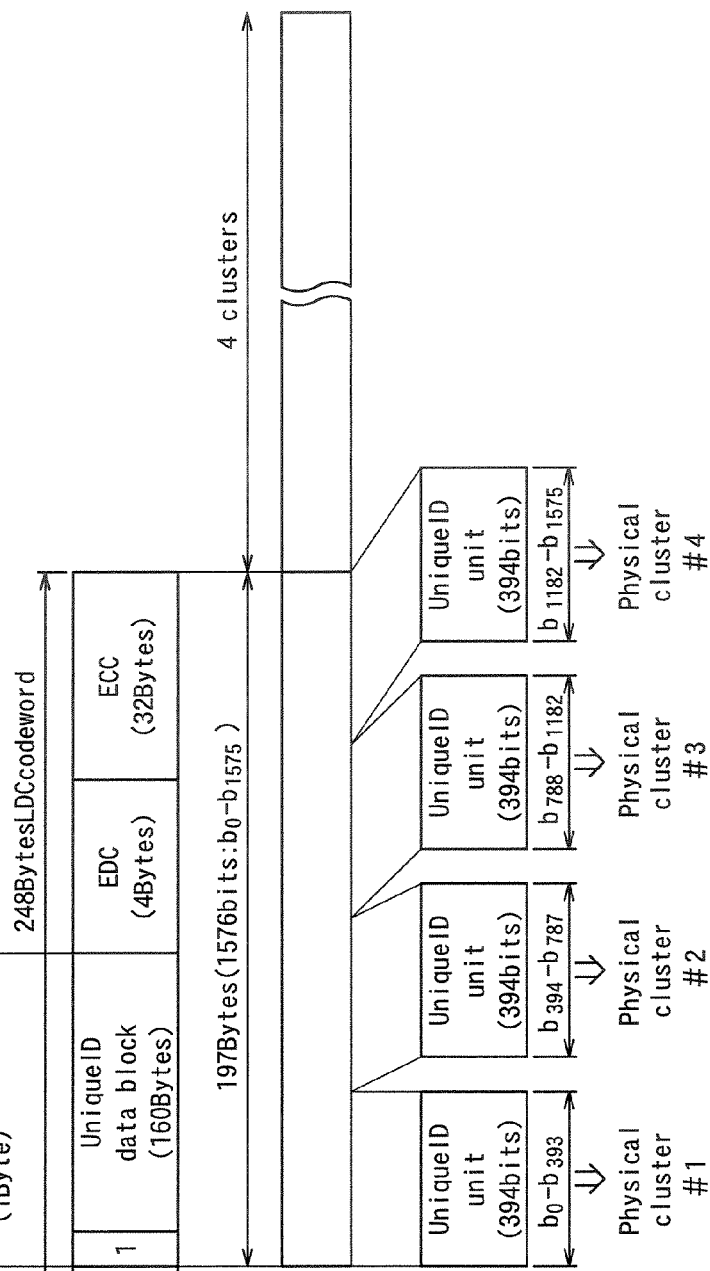
FIG. 13A  FIG. 13B  FIG. 13C  FIG. 13D  FIG. 13E

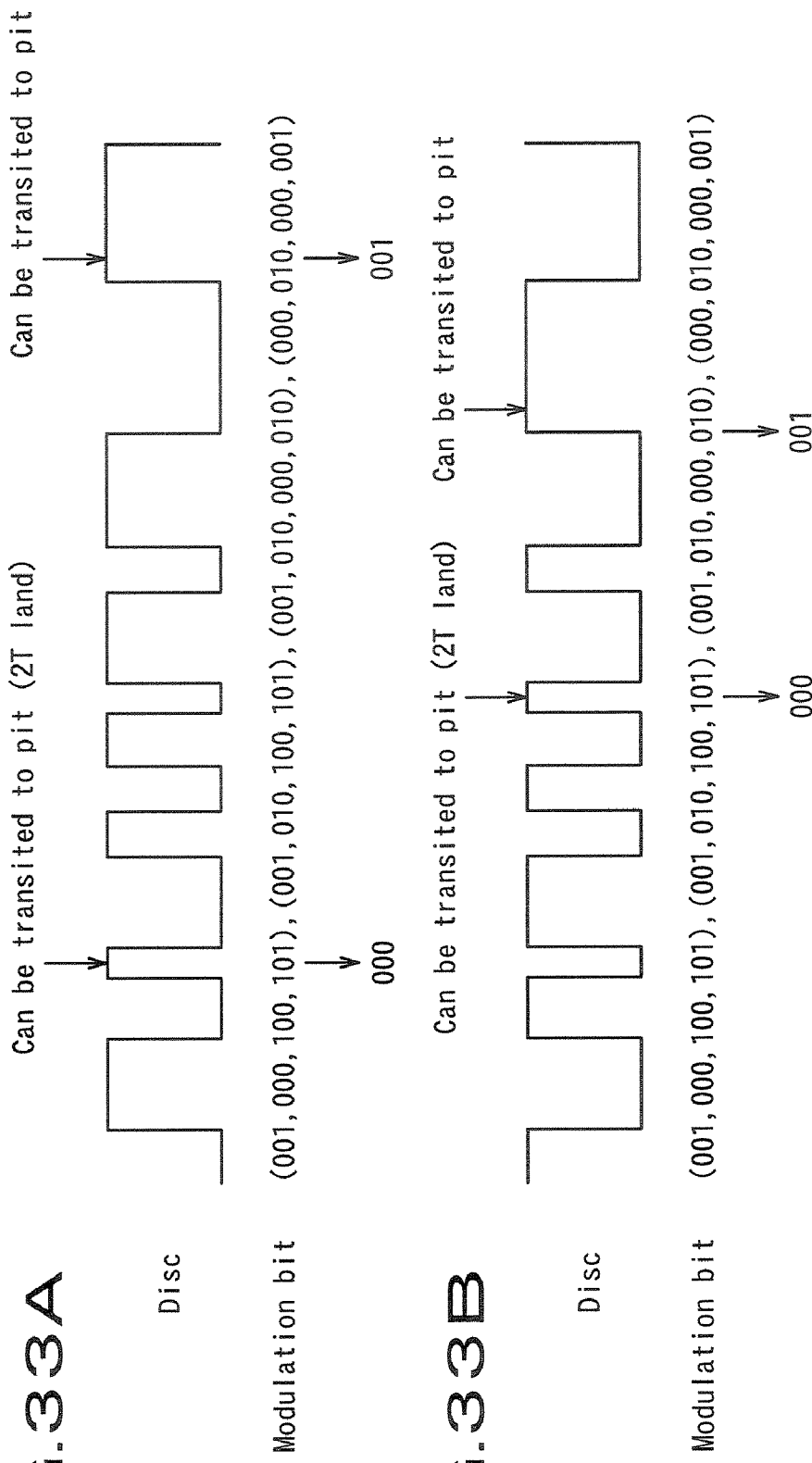

US 8,050,163 B2

OPTICAL DISC MANUFACTURING METHOD AND DEVICE, OPTICAL DISC, AND OPTICAL DISC REPRODUCTION METHOD

TECHNICAL FIELD

The present invention relates to a method and apparatus for producing a read-only optical disc having an identifier additionally recorded thereon, a read-only optical disc having an identifier additionally recorded thereon, and a method and apparatus for playing a read-only optical disc having an identifier additionally recorded thereon.

This application claims the priority of the Japanese Patent Application No. 2004-319559 filed in the Japanese Patent Office on Nov. 2, 2004 the entirety of which is incorporated by reference herein.

BACKGROUND ART

As the information recording medium on which copyrighted work information such as a piece of music, image, etc. can be recorded in a digital form, there are widely known read-only optical discs such as a CD (compact disc), DVD (digital versatile disc) and the like.

Copyrighted work information can be recorded on an optical disc such as a CD or DVD by forming, on a disc-shaped substrate of the latter, a land/pit pattern corresponding to a digital form of the copyrighted work information. A disc master having such copyrighted work information thus recorded thereon can be replicated to produce and sell a large number of optical discs carrying the same copyrighted work information.

So, in marketing such optical discs, it is necessary to prevent the optical disc from being illegally copied and the copyright on work information recorded on the optical disc from being infringed. However, since read-only optical discs are designed to have only same information recorded thereon, they cannot be differentiated from each other. That is, the read-only optical disc is not necessarily desirable from the standpoint of medium management.

As a solution to the problems in the medium management of the optical discs, there is available a method of additionally recording medium-unique information different from one medium to another on a part of each read-only optical disc. By additionally writing medium-unique information to each medium, it is possible to build a system in which a disc player reads the medium-unique information on an optical disc and which sends it to a server via a network. In case illegal copies of an optical disc having copyrighted work information recorded thereon are produced and marketed without permission of the copyright holder, many pieces of the same medium-unique information will be detectable by such a system via the network, by which it is alarmed that the illegal copies of the optical disc in consideration are on the market. Further, the detected medium-unique information can be traced to ascertain a person having illegally copied the optical disc without permission and also prevent such illegal copying. Recording of such medium-unique information on each read-only optical disc can be a very effective solution to the problem of such an illegal copying of a read-only optical disc.

Even a piece of medium information unique to each title of work information recorded on an optical disc will be useful to protect the copyright on the work information as long as it is recorded in such a manner that it cannot easily be copied by any commercially available recorder/player.

It is well known to utilize the "Postscribed ID (trademark)" developed by the Sony and Sony Disclosure for additionally writing an Identifier unique to each optical medium to a portion of the optical disc where work information as a content or the like is recorded in the form of a land/pit pattern.

The method utilizing the "Postscribed ID" will be explained herebelow. An optical disc such as a CD of which the reflecting layer as a recording layer is formed from a material that can be melted by additional-writing light is produced once. Next, a land in a predetermined portion of a land/pit pattern formed on a recording track of the optical disc is concaved, namely, transited to a pit by irradiating a high-power laser beam.

An area where the land may be transited to a pit is provided in a plurality of predetermined portions on a read-only optical disc, it is decided based on information unique to the optical disc whether each of the land portions is to be transited to a pit or left as it is, and the unique disc information is additionally written in the area where actual work information as a content or the like is recorded.

In case the above Postscribed ID is utilized, since it is necessary that a location where the Postscribed ID is recorded should be detectable by a player for the optical disc, the portion of the optical disc where a land is transited to a pit should be limited to a predetermined portion of the optical disc. Further, if a data row that will not comply with a modulation rule after the land is transited to a pit, the optical disc will not be playable. So, it is necessary to abide by the modulation rule also after the land is transited to a pit.

A recording rule having solved the above problems with a CD or DVD adopting the EFM (eight-fourteen modulation) or EFM+technique is disclosed in the Japanese Patent Application Laid-Open Disclosure No. 2003-141742 and Japanese Patent Gazette No. 2003-151145.

Recently, there has been proposed a BD (blue-ray) disc (will be referred to as "BD disc" hereunder) as a recording medium of a generation next to the CD and DVD. A read-only BD disc should desirably have an Identifier additionally recorded thereon with an Identifier recording technique such as the aforementioned Postscribed ID.

DISCLOSURE OF THE INVENTION

It should be noted the BD disc adopts the 17PP modulation technique, not the EFM or EFM+ as in the CD and DVD, for recording an Identifier.

Different from the EFM or EFM+ technique in which a fixed bit length (8 bits) is used, the 17PP modulation is made in units of 2 bits. Also, the BD disc format is such that one DC control bit is inserted periodically before the 17PP modulation is made of information to be recorded. Also, a recording type player complying with the BD standard has been put on the market.

Given these circumstances, recording a Postscribed ID on the BD disc will possibly cause the following problems.

When recording a Postscribed ID results in transition of a train of pits to lands, the transition will possibly lead to change of the DC control bit alone. Since the DC control bit is discarded in the process of decoding, it will be impossible to detect whether the Postscribed ID has been recorded or not on the BD disc.

Since the 17PP modulation uses a variable-length code of which the unit of modulation is variable, when a Postscribed ID is recorded to transit part of a bit row to a land, it will be highly possible that some data recorded before and after the Postscribed ID will result in a code word not defined in the 17PP modulation rule. In such a case, some of disc players cannot correctly read medium-unique information recorded as a Postscribed ID, which however depends upon the design of the players.

In case the 17PP demodulation circuit, error correction circuit, etc. used in the already commercially available BD disc players have to be modified, it will be necessary to change the LSI used in the player, which will add to the price of the player.

It is therefore desirable to provide an optical disc playing apparatus and method, capable of positively detecting an identifier in an optical disc in which a bit row subjected to variable-length modulation such as 17PP modulation or the like is recorded to append a medium- or title-unique ID for identification/management of the optical disc, and an optical disc producing method.

According to an embodiment of the present invention, there is provided an optical disc producing method of producing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, the method including a disc forming step of forming the read-only optical disc with the use of an optical disc master; and an identifier appending step of additionally writing a disc-unique identifier to a specific cluster on the read-only optical disc by irradiating laser light having a power higher than the reading power level to the lands to give the latter an optical property equal to that of the pits; in the disc forming step, there being produced the read-only optical disc in which an information bit row, not yet subjected to the variable-length modulation, in the specific cluster to which the identifier is to be appended is given a specific value, and in the identifier appending step, lands located in positions where the entire bit row will comply with the variable-length modulation rule even if the lands are replaced with pits being changed by the lasering to have an optical property equal to that of the pits.

According to another embodiment of the present invention, there is also provided an optical disc producing method of producing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, the method including a disc forming step of forming the read-only optical disc with the use of an optical disc master; and an identifier appending step of additionally writing a disc-unique identifier to a specific cluster on the read-only optical disc by irradiating laser light having a power higher than the reading power level to the lands to give the latter an optical property equal to that of the pits; in the identifier appending step, with continuous areas corresponding to bits of the identifier being preset in predetermined positions in the cluster, lands (specific land) included in each continuous area and located in positions where the entire bit row will comply with the variable-length modulation rule even if the lands are replaced with pits being changed by the lasering corresponding to the value of each bit in the identifier to have an optical property equal to that of the pits.

According to another embodiment of the present invention, there is also provided a read-only optical disc in which recording is made in units of a cluster including a row of recording-information bits and an error-correcting code, lands and pits are formed contiguously to each other along a recording track and the sequence of lands and pits complies with a predetermined variable-length modulation rule, wherein the disc includes a specific cluster having a disc-unique identifier additionally written thereto by irradiating laser light having a power higher than the reading power level to lands in the cluster (lasering) to give the lands a optical property equal to that of the pits, the disc-unique identifier is appended by changing, by the lasering, the lands located in positions where the entire bit row will comply with the variable-length modulation rule even if the lands are replaced with pits to have an optical property equal to that of the pits, and the information bit row, not yet subjected to the variable-length modulation, of the cluster having the identifier appended thereto has a specific value.

According to another embodiment of the present invention, there is also provided a read-only optical disc in which recording is made in units of a cluster including a row of recording-information bits and an error-correcting code, lands and pits are formed contiguously to each other along a recording track and the sequence of lands and pits complies with a predetermined variable-length modulation rule, wherein the disc includes a specific cluster having a disc-unique identifier additionally written thereto by irradiating laser light having a power higher than the reading power level to lands in the cluster (lasering) to give the lands a optical property equal to that of the pits, the specific cluster has preset in a predetermined position therein a continuous area corresponding to each bit of the identifier, and the continuous area has a bit value corresponding to the identifier recorded by the lasering on the lands located in positions where the entire bit row will comply with the variable-length modulation rule even if the lands are replaced with pits.

According to another embodiment of the present invention, there is also provided an optical disc producing apparatus for producing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, the apparatus comprising an identifier appending means for additionally writing a disc-unique identifier to a specific cluster on the read-only optical disc by irradiating laser light having a power higher than the reading power level to the lands (lasering) to give the latter an optical property equal to that of the pits, the information bit row in the specific cluster to which the identifier is to be appended having a specific value, and the identifier appending means changing lands (specific land) located in positions where the entire bit row will comply with the variable-length modulation rule even if the lands are replaced with pits by the lasering to have an optical property equal to that of the pits.

According to another embodiment of the present invention, there is also provided an optical disc producing apparatus for producing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, the apparatus comprising an identifier appending means for additionally writing a disc-unique identifier to a specific cluster on the read-only optical disc by irradiating laser light having a power higher than the reading power level to the lands (lasering) to give the latter an optical property equal to that of the pits, the identifier appending means presetting continuous areas corresponding to bits of the identifier in predetermined positions in the cluster and changing lands (specific land) included in each continuous area and located in positions where the entire bit row will comply with the variable-length modulation rule even if the lands are replaced with pits to have an optical property equal to that of the pits by the lasering corresponding to the value of each bit in the identifier.

According to another embodiment of the present invention, there is also provided an optical disc producing method of producing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, the method including an information bit row forming step of forming a modulated bit row which is to be a land/pit pattern on the optical disc; an identifier appending step of additionally writing an identifier to a specific cluster on the read-only optical disc by making pattern inversion to transit a predetermined land in the modulated bit row to a pit; a disc master forming step of forming an optical disc master having the modulated bit row recorded therein after having the identifier additionally written; and a disc forming step of forming the read-only optical disc with the use of the optical disc master; in the information bit row forming step, there being formed the read-only optical disc in which the information bit row, not yet subjected to the variable-length modulation, in the specific cluster to which the identifier is to be appended has a specific value, and in the identifier appending step, lands (specific land) located in positions where the entire bit row will comply with the variable-length modulation rule even if the lands are replaced with pits being transited to pits by the pattern inversion.

According to another embodiment of the present invention, there is also provided an optical disc producing method of producing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, the method including an information bit row forming step of forming a modulated bit row which is to be a land/pit pattern on the optical disc; an identifier appending step of additionally writing an identifier to a specific cluster on the read-only optical disc by making pattern inversion to transit a predetermined land in the modulated bit row to a pit; a disc master forming step of forming an optical disc master having the modulated bit row recorded therein after having the identifier additionally written; and a disc forming step of forming the read-only optical disc with the use of the optical disc master; in the information bit row forming step, continuous areas corresponding to bits of the identifier being preset in predetermined positions in the cluster and lands (specific land) included in each continuous area and located in positions where the entire bit row will comply with the variable-length modulation rule even if the lands are replaced with pits being changed by the pattern inversion corresponding to the value of each bit in the identifier to have an optical property equal to that of the pits.

According to another embodiment of the present invention, there is also provided a read-only optical disc in which recording is made in units of a cluster including a row of recording-information bits and an error-correcting code, lands and pits are formed contiguously to each other along a recording track and the sequence of lands and pits complies with a predetermined variable-length modulation rule, wherein the disc includes a specific cluster having a disc-unique identifier additionally written thereto after having a land/pit pattern formed thereon by modulating an arbitrary information bit row and error-correcting code for the bit row, the disc-unique identifier is appended by transiting, to pits, the lands located in positions where the entire bit row will comply with the variable-length modulation rule even if the lands are replaced with the pits, and the information bit row, not yet subjected to the variable-length modulation, of the cluster having the identifier appended thereto has a specific value.

According to another embodiment of the present invention, there is also provided a read-only optical disc in which recording is made in units of a cluster including a row of recording-information bits and an error-correcting code, lands and pits are formed contiguously to each other along a recording track and the sequence of lands and pits complies with a predetermined variable-length modulation rule, wherein the disc includes a specific cluster having a disc-unique identifier additionally written thereto after having a land/pit pattern formed thereon by modulating an arbitrary information bit row and error-correcting code for the bit row, the specific cluster has preset in a predetermined position therein a continuous area corresponding to each bit of the identifier, and the disc-unique identifier is appended to the continuous area by transiting, to pits, the lands located in positions where the entire bit row will comply with the variable-length modulation rule even if the lands are replaced with pits.

According to another embodiment of the present invention, there is also provided an optical disc producing apparatus for producing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, the apparatus comprising an identifier appending means which is supplied with a modulated bit row that will be a land/pit pattern on the read-only optical disc and additionally writes an identifier to a specific cluster on the read-only optical disc by transiting a specific land of the modulated bit row to a pit (pattern inversion), of the bit row supplied to the identifier appending means, an information bit row, and not yet subjected to the variable-length modulated, in the specific cluster to which the identifier is to be appended having a specific value, and the identifier appending means changing, to pits by the pattern inversion, lands (specific land) located in positions where the entire bit row will comply with the variable-length modulation rule even if the lands are replaced with the pits.

According to another embodiment of the present invention, there is also provided an optical disc producing apparatus for producing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, the apparatus comprising an identifier appending means which is supplied with a modulated bit row that will be a land/pit pattern on the read-only optical disc and additionally writes an identifier to a specific cluster on the read-only optical disc by transiting a specific land of the modulated bit row to a pit (pattern inversion), the identifier appending means presetting continuous areas corresponding to bits of the identifier being preset in predetermined positions in the cluster and transiting, to pits by the pattern conversion corresponding to the value of each bit in the identifier, lands (specific land) included in each continuous area and located in positions where the entire bit row will comply with the variable-length modulation rule even if the lands are replaced with pits.

According to another embodiment of the present invention, there is provided an optical disc playing method of playing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, wherein the disc includes a specific cluster having a disc-unique identifier additionally written thereto after having a land/pit pattern formed thereon by modulating an arbitrary information bit row and error-correcting code for the bit row, the disc-unique identifier is appended by transiting, to pits, the lands located in positions where the entire bit row will comply with the variable-length modulation rule even if the lands are replaced with the pits, and the information bit row, not yet subjected to the variable-length modulation, of the cluster having the identifier appended thereto has a specific value, the method comprising the steps of demodulating the bit row read from the optical disc by the variable-length modulation; making error correction of the demodulated bit row; and detecting the identifier in the cluster having the identifier appended thereto; when the identifier is detected, comparison being made between the demodulated information bit row in the cluster having the identifier appended thereto and the specific value to detect the identifier.

According to another embodiment of the present invention, there is also provided an optical disc playing method of playing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, wherein the disc includes a specific cluster having a disc-unique identifier additionally written thereto after having a land/pit pattern formed thereon by modulating an arbitrary information bit row and error-correcting code for the bit row, in the specific cluster, a continuous area corresponding to each bit of the identifier being preset in a predetermined position, in the continuous area, the disc-unique identifier being appended by transiting, to pits, the lands located in positions where the entire bit row will comply with the variable-length modulation rule even if the lands are replaced with the pits, the method comprising the steps of demodulating the bit row read from the optical disc by the variable-length modulation; making error correction of the demodulated bit row; and detecting the identifier in the cluster having the identifier appended thereto; when the identifier is detected, no error correction being made but the bit row in each of the continuous areas in the cluster having the identifier appended thereto being extracted to detect the identifier.

According to another embodiment of the present invention, there is provided an opting disc playing apparatus for playing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, the disc including a specific cluster having a disc-unique identifier additionally written thereto after having a land/pit pattern formed thereon by modulating an arbitrary information bit row and error-correcting code for the bit row, the disc-unique identifier being appended by transiting, to pits, the lands located in positions where the entire bit row will comply with the variable-length modulation rule even if the lands are replaced with the pits, and the information bit row, not yet subjected to the variable-length modulation, in the cluster having the identifier appended thereto has a specific value, the apparatus comprising a demodulating means for demodulating the bit row read from the optical disc by the variable-length modulation; an error-correcting means for making error correction of the demodulated bit row; and an identifier detecting means for detecting the identifier in the cluster having the identifier appended thereto; when the identifier is detected, the error-correcting means detecting the identifier by making a comparison being made between the demodulated information bit row in the cluster having the identifier appended thereto and the specific value.

According to another embodiment of the present invention, there is provided an optical disc playing apparatus for playing a read-only optical disc in which recording is made in units of a cluster including a row of recording-information bits and an error-correcting code, lands and pits are formed contiguously to each other along a recording track and the sequence of lands and pits complies with a predetermined variable-length modulation rule, the disc including a specific cluster having a disc-unique identifier additionally written thereto after having a land/pit pattern formed thereon by modulating an arbitrary information bit row and error-correcting code for the bit row, in the specific cluster, a continuous area corresponding to each bit of the identifier being preset in a predetermined position, in the continuous area, the disc-unique identifier being appended by transiting, to pits, the lands located in positions where the entire bit row will comply with the variable-length modulation rule even if the lands are replaced with the pits, the apparatus including a demodulating means for demodulating the bit row read from the optical disc by the variable-length modulation; an error-correcting means for making error correction of the demodulated bit row; and a detecting means for detecting the identifier in the cluster having the identifier appended thereto; when the identifier is detected, the error-correcting means making no error correction but the identifier detecting means detecting the identifier by extracting the bit row in each of the continuous areas in the cluster having the identifier appended thereto.

According to the present invention, the identifier can positively be recorded in an optical disc in which a bit row subjected to the variable-length modulation such as the 17PP modulation or the like for management of each medium or title with the appended unique identifier. Also, the present invention needs no modification of the conventional modulation circuit, demodulation circuit, etc.

BRIEF DESCRIPTION OF THE DRAWINGS

FIG. 12 shows the bit pattern of a frame sync.

FIGS. 13A to 13E show the format of a unique ID.

FIGS. 33A and 33B show a position where a land of a 4-byte continuous area is transited to a pit in another embodiment.

BEST MODE FOR CARRYING OUT THE INVENTION

Figure 1A:
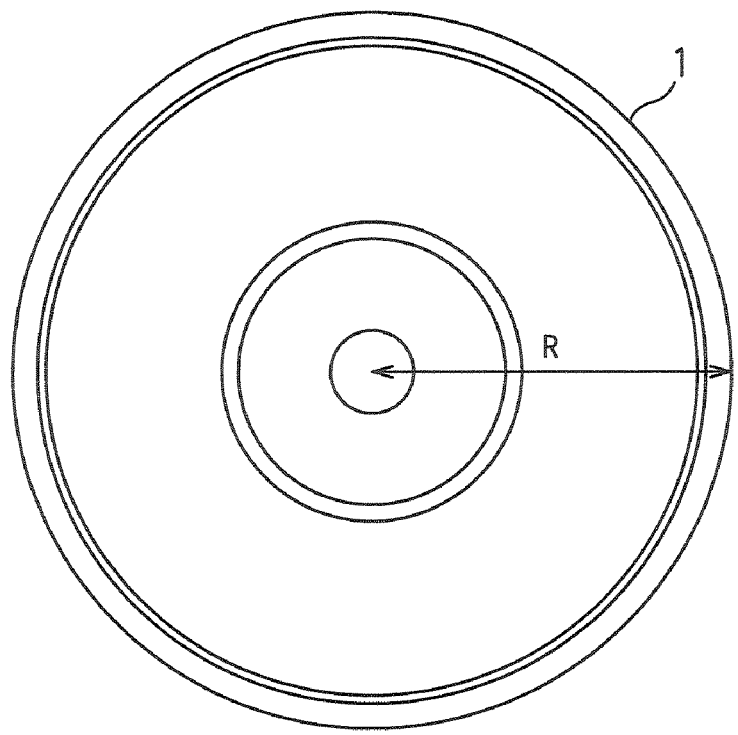
FIG. 1A is a plan view of an optical disc as an embodiment of the present invention.

The present invention will be explained in detail below concerning an optical disc, and producing method and playing method for the optical disc with reference to the accompanying drawings.

Physical Properties of the Optical Disc and Unique ID (Physical Properties)

First, the optical disc, indicated with a reference numeral 1, as an embodiment of the present invention will be described concerning its basic physical properties.

The optical disc 1 is a blue-ray disc (will be referred to as "BD disc" hereunder) and it is a read-only version to which the user himself or herself cannot write data. As shown in FIG. 11A, the optical disc 1 has a radius R of about 60 mm and thickness d of about 12 mm. For playing this BD disc, a light beam of 405 nm in wavelength, so-called blue-violet laser light, is used. The numeral aperture (NA) of the objective lens is 0.85.

Figure 1B:
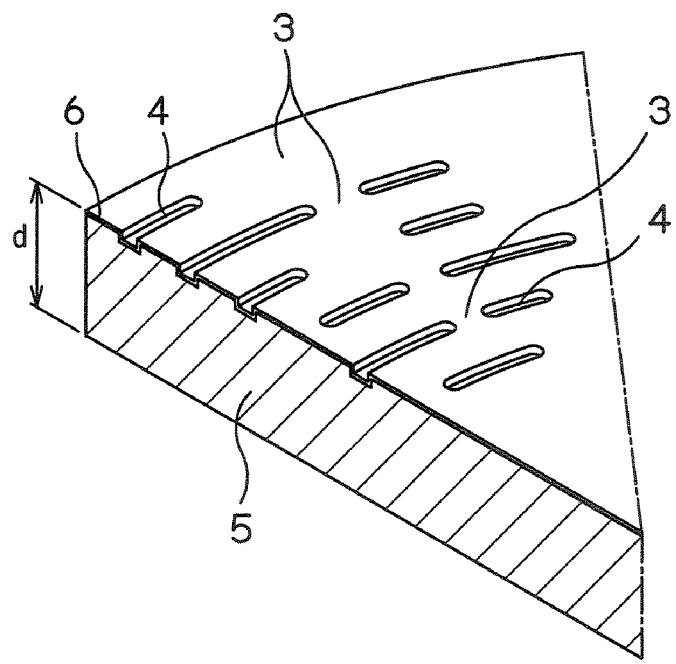
FIG. 1B is a perspective view of a land/pit pattern formed on the optical disc.

As shown in FIG. 1B, the optical disc 1 has a signal written on a bottom 3 thereof which is also a reflecting surface 6 of the disc by forming concavities 4 along the recording track. That is, a sequence of concavities and convexities corresponding to a row of bits of data to be recorded is formed on the recording track. It should be noted that the concavity 4 formed on the bottom 3 of the recording track will be referred to as "pit" hereunder and the bottom 3 other than the pits on the bottom of the recording track be referred to as "land" hereunder.

It should be noted here that the reflecting layer 6 will not have the material property thereof changed in any way when irradiated with laser light whose power is at an ordinary reading power level. However, the reflecting layer is formed from such a material as will be melted when irradiated with laser light whose power level is sufficiently higher than the reading power level so that the melted portion thereof will be equal in reflectance to the pit portion. That is, the land is formed from such a material that the land will be regarded as a pit when irradiated with high-power laser light. The reflecting layer of the ordinary optical recording medium is formed from aluminum, but the optical disc 1 has the reflecting layer 6 thereof formed from, for example, an alloy of aluminum and titanium, an alloy of aluminum and other element, an alloy containing silver or the like.

A pattern of convexities and concavities (land/pit pattern) is transcribed by a stamper or the like to a substrate of polycarbonate or acrylic of the optical disc 1 to record a land/pit pattern corresponding to content data on the recording track.

(Unique ID)

Each optical disc 1 further has a unique identifier (will be referred to as "unique ID" or "UID" hereunder) additionally recorded in the recording track having transcribed thereon a land/pit pattern pre-formed on a stamper used in production of the optical disc 1.

The unique ID is appended by the lasering. More specifically, it is additionally recorded by irradiating a high-power laser beam to a land in a predetermined position in the recording track on the disc for transition to a pit. More specifically, an area where a land can be transited to a pit is provided in each of a plurality of predetermined portions in a recording area, it is decided based on the bit value of the unique ID whether each of the predetermined portions is to be transited to a pit or to be left as a land, and then the laser light is irradiated to each of the portions.

Figure 2A:
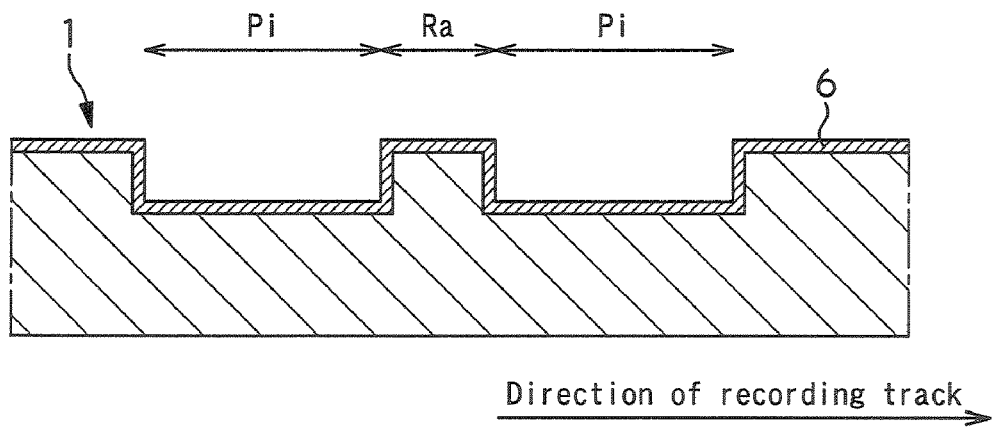
FIGS. 2A to 2C are sectional views of the optical disc, showing the land/pit pattern before and after melted by laser light.
Figure 2B:
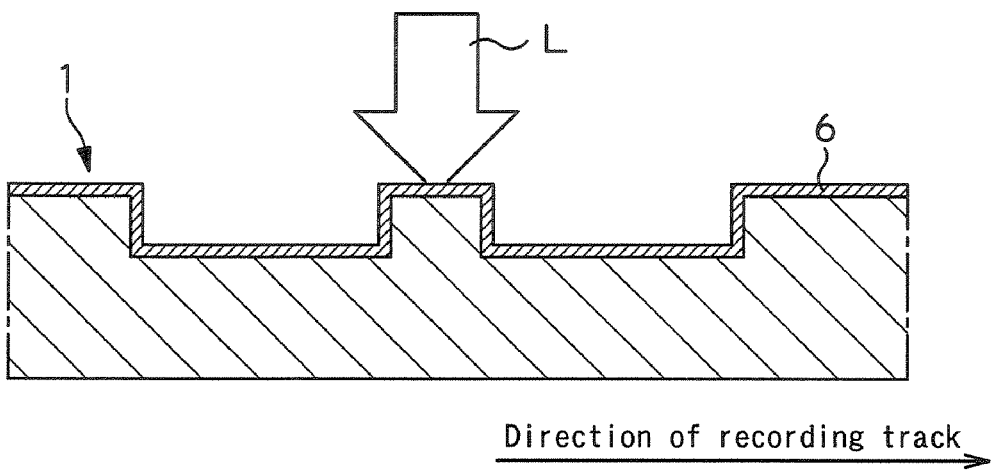
Figure 2C:
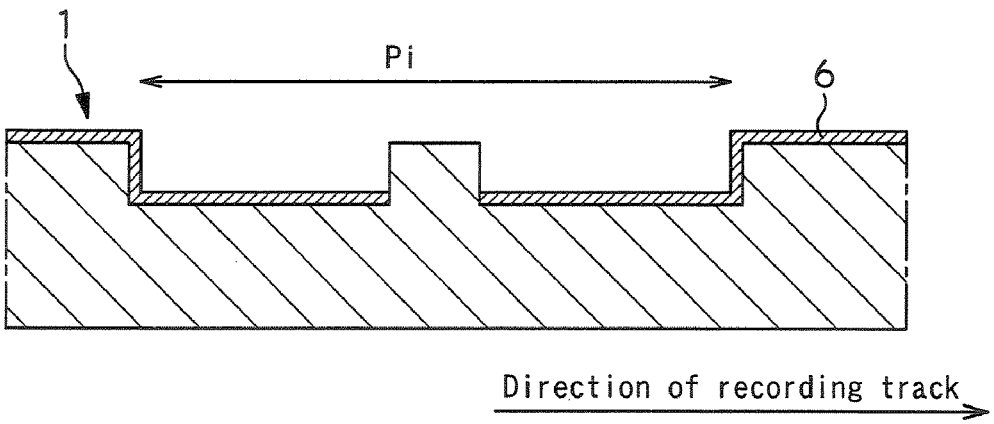
Figure 3A:
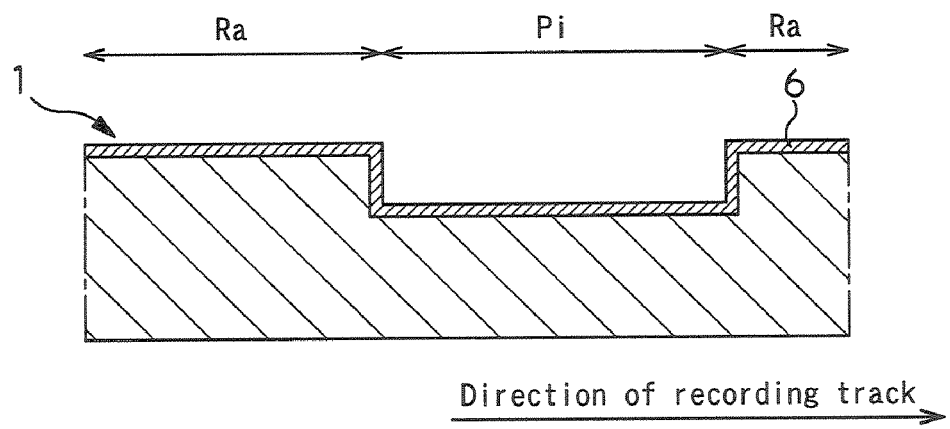
FIGS. 3A to 3C are sectional views of the optical disc, showing another land/pit pattern before and after melted by laser light.
Figure 3B:
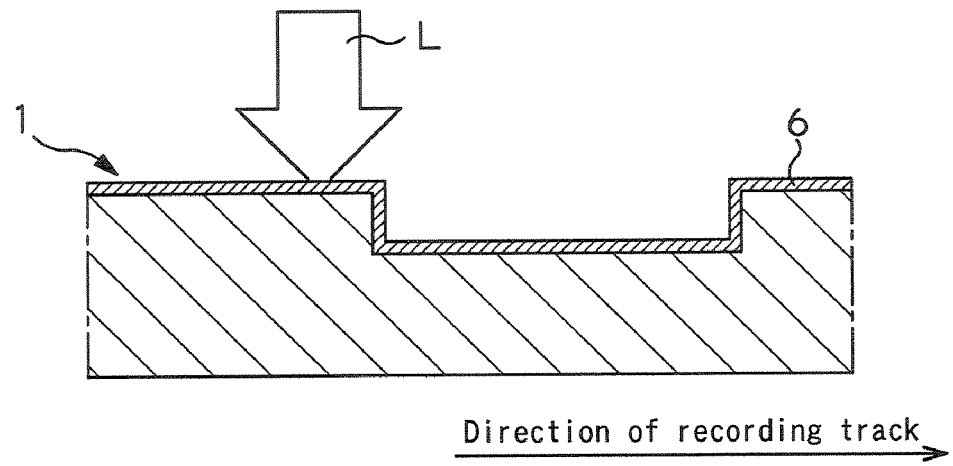
Figure 3C:
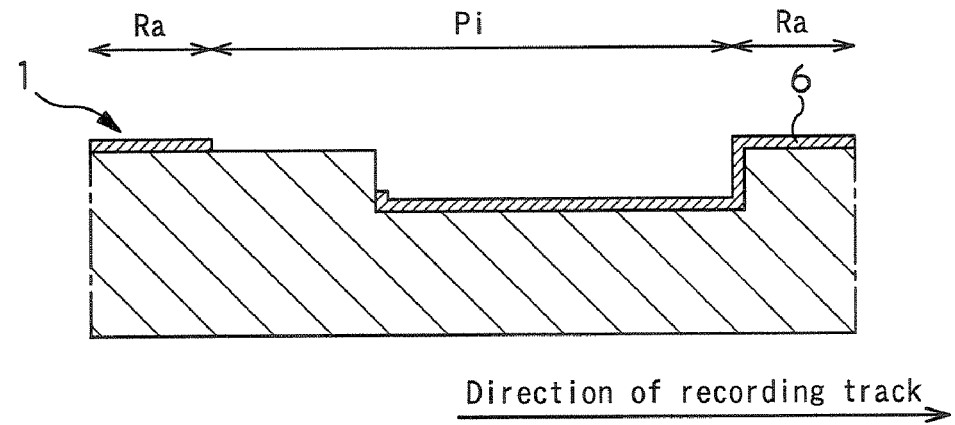

More particularly, high-power laser light L shown in FIGS. 2B and 3B is irradiated to a land Ra in a predetermined position as shown in FIGS. 2A and 3B. The high-power laser light L has a power sufficiently higher than the reading-power level to melt the land Ra. When the land is irradiated with such high-power laser light, the reflecting layer 6 on the land Ra is melted away as shown in FIGS. 2C and 3C. Light irradiated to the portion, from which the reflecting layer 6, has thus disappeared will not return. Namely, that portion will have a reflectance equal to that of a pit Pi. Thus, the unique ID is additionally recorded by transiting the land Ra to a pit after a land/pit pattern is transcribed by a stamper.

Thus, the disc-unique identifier can additionally be recorded on the optical disc 1 even if the latter is a read-only one.

It should also be noted that the BCA (Burst Cutting Area) method may be used to additionally record such a disc-unique identifier. When this BCA technique is adopted, recording of one-bit information needs blasting off a reflecting layer of 800 µm in width radially for reading/writing without tracking control. According to the present invention, however, one-bit information can be recorded by irradiating laser light with tracking control to blast off a reflecting layer whose width is smaller than a one-track width (0.32 μm). Namely, the width required for recording the one-bit information is 800 μm in the BCA method while it is only 0.3 μm in the method according to the present invention, which means that the distance over which the reflecting layer has to be blasted off in the method according to the present invention is 1000 times or more shorter than that in the BCA method. Thus, the laser power and time required for recording in the method according to the present invention may overwhelmingly be smaller than those required in the BCA method. Also, in the BCA method, since no tracking is possible, it is not possible to decide which portion of the 800 μm-wide recording area is being read. Therefore, the optical discs each having the unique ID additionally recorded thereon by the BCA method cannot not efficiently be inspected for shipment because the entire 800 μm-wide recording area has to be checked. On the contrary, the optical discs having the unique ID additionally recorded thereon by the method according to the present invention is readable and writable while tracking is being made, and thus can positively be inspected at the time of shipping. It should be noted that the unique ID format, position on the disc where the unique ID is to be written, reading of the unique ID, etc. will be explained later.

Optical Disc Format

Data recorded in the optical disc is managed with reference to a predetermined format. User information is subjected to error-correction coding into a Reed-Solomon code which uses a long-distance code in units of a predetermined block, and the error-correction-coded information is subjected to 17PP modulation and NRZI conversion.

(Error Correction)

Next, the error correction will be explained.

The whole of file data or content data (user data) such as music or image to be recorded on the optical disc 1 is divided into data groups each of 64 kilobytes and an error-detecting code (EDC) and error-correcting code (ECC) are appended to each of the data groups each of 64 kilobytes to form a basic data unit called "ECC cluster".

The ECC cluster is configured as will be explained in detail below:

First, the data group of 64 kilobytes is further divided into 32 data groups.

Figure 4:
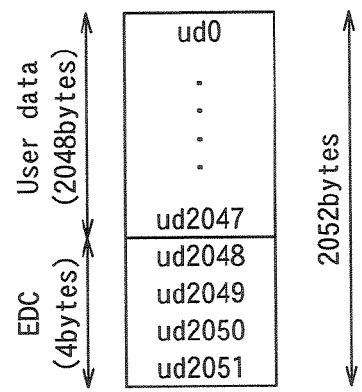
FIG. 4 shows a data format having an error-detecting code (EDC) additionally recorded thereon.

Next, an error-detecting code (EDC) of 4 bytes is appended to each data group (user data) of 2048 bytes to provide a data group of 2052 bytes in total as shown in FIG. 4.

Then, the 32 data groups each of 2052 bytes are scrambled and re-combined to restore the original data groups (32×2052 bytes).

Figure 5:
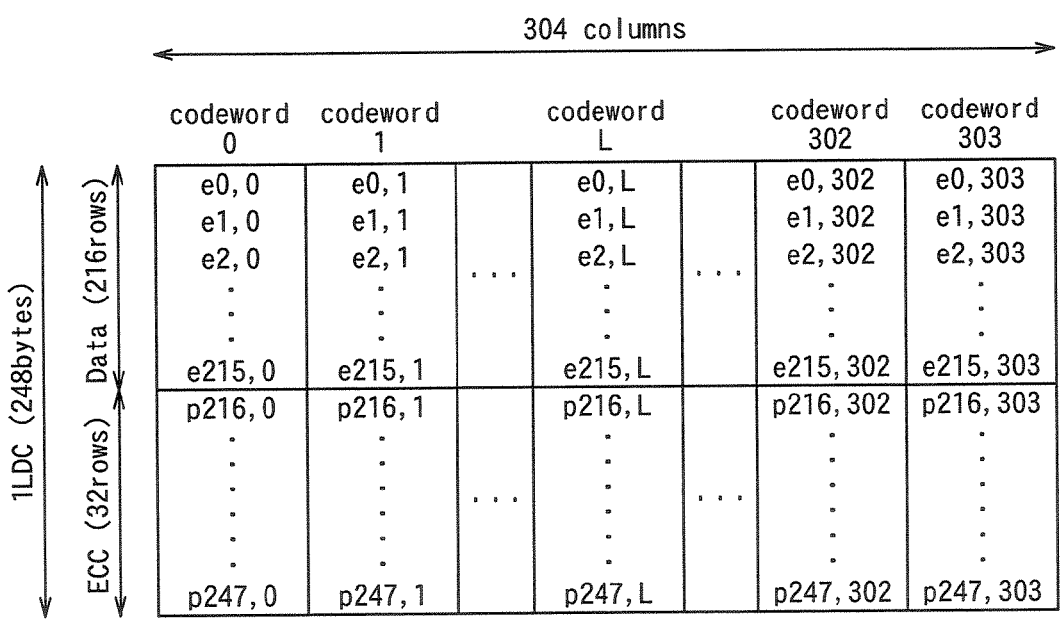
FIG. 5 shows a data format having an error-correcting code (ECC) additionally recorded thereon.

Then, the scrambled 32 data groups each of 2052 bytes are formed into blocks each of 304 byte rows by 216 lines and an error-correcting code (ECC) of 204 byte rows by 32 lines is appended to each of the blocks as shown in FIG. 5. The Reed-Solomon code is used as the error-correcting code.

Finally, the error-correcting code of 248 lines by 204 byte rows is subjected to a predetermined interleaving for rearrangement. Here, an ECC cluster is complete.

The optical disc 1 uses a data unit called "BIS cluster" in addition to the ECC cluster. The BIS cluster is a data unit including an ECC cluster number called "address", number for a block in the ECC cluster and a number indicative of the function of information recorded in an ECC cluster called "user control".

The BIS cluster is configured as will be explained in detail below:

First, an address is formed which includes 4-byte information indicative of an address number, 1-byte information as additional data and an error-correcting code being a 4-byte Reed-Solomon code.

Next, the above 9-byte address information and a 21-byte user control are combined together to for 24 data groups each of 30 bytes.

Figures 6, 7:
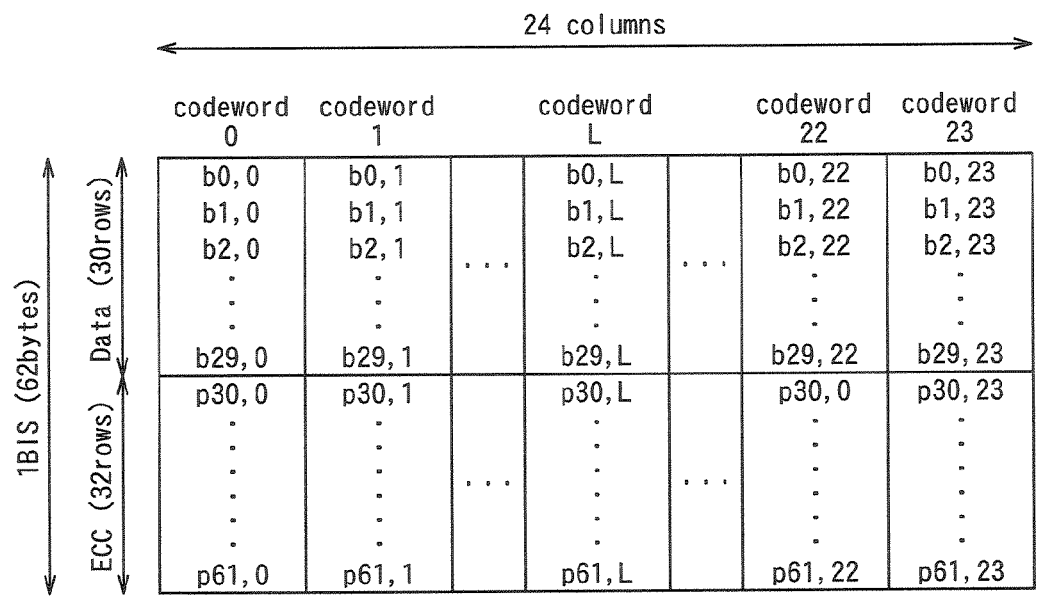
FIG. 6 shows a BIS format.
FIG. 7 shows the relation between a physical cluster and linking cluster.

Then, a 32-byte error-correcting code is appended to the 30-byte data group as shown in FIG. 6, and finally it is subjected to a predetermined interleaving for rearrangement. Here, a BIS cluster is complete.

(Main-Data Physical Format)

Next, the physical format in which main data is to be recorded will be explained.

The optical disc 1 has a physical layer including physical clusters having recorded therein data formed from a combination of an ECC cluster and BIS cluster and two linking parts that link the physical clusters to each as shown in FIG. 7. The physical clusters and linking parts appear repeatedly.

One physical cluster has one ECC cluster (304 bytes×(216 lines+32 lines)) recorded therein.

Figure 8:
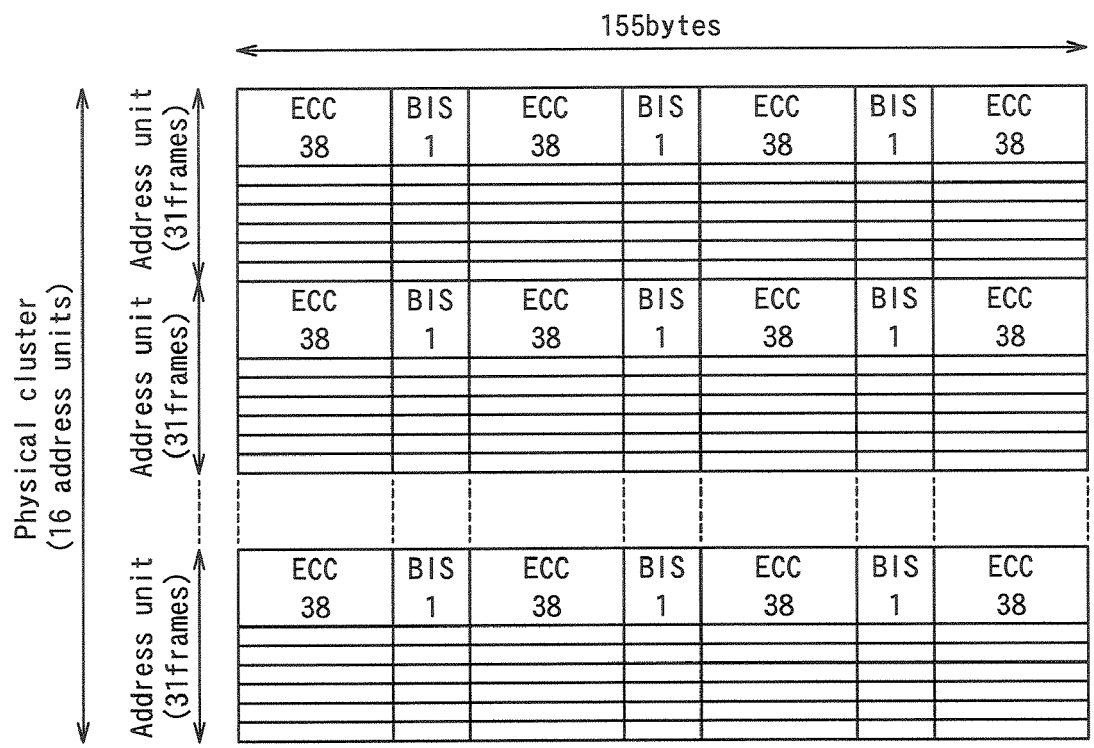
FIG. 8 shows the data structure of an address unit.

As shown in FIG. 8, each physical cluster is divided into 16 blocks called "address unit", and each address unit includes 31 data frames. Each linking unit includes two data frames.

Figure 9:
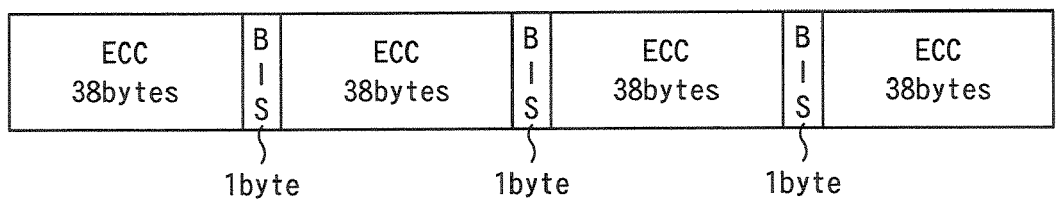
FIG. 9 shows the configuration of a data frame.

The data frame has 155-byte information recorded therein as shown in FIG. 9. Of the data in the data frame, three bytes including the 39th, 78th and 117th bytes are included in the BIS cluster, while the remaining 152 bytes are included in the ECC cluster.

Figures 10, 11:
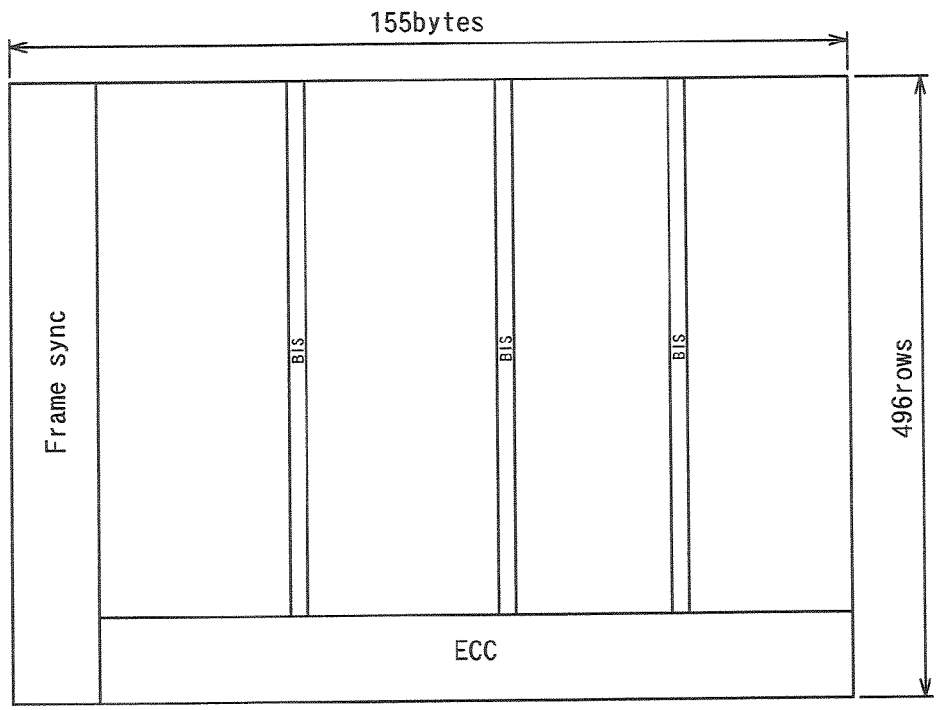
FIG. 10 shows the data structure of the physical cluster.
FIG. 11 shows a conversion table for the 17PP modulation.

The above-mentioned physical cluster has placed at the top of each data frame thereof a frame sync which is a sync data pattern indicative of the top of the data frame, as shown in FIG. 10.

The physical clusters are subjected to 17PP modulation and NRZI conversion at each data frame including the frame sync to have a predetermined address recording pattern in the optical disc 1.

It should be noted that the ECC and BIS clusters rearranged so that the error-correcting code (ECC) will always be positioned after a physical cluster.

(17PP Modulation Table)

Next, the 17PP modulation will be explained.

FIG. 11 shows a conversion table for the 17PP modulation. In this table, the "data bits" column lists bit rows not yet modulated, and "modulation bits" column lists bit rows already modulated. Also, "xx" in the conversion table in FIG. 11 means that "x" takes either the value "0" or "1" arbitrarily. It should be noted that "(−fs)" in FIG. 11 indicates a bit row in a frame sync.

FIG. 12 shows frame sync. In FIG. 12, "#" will be "1" only when the bit row not yet modulated before this frame sync is set is "00" or "0000", and "0" when the bit row is other than "00" or "0000".

As will be known from the conversion table in FIG. 11, the 17PP modulation for use with the BD disc is a variable-length modulation in which a bit length as a unit of conversion varies.

Also, the 17PP modulation for the BD disc is a run-length modulation in which the continuous length of "1" after modulated is "1" and that of "0" is less than 8. The number of "1" when the bit row is not yet modulated is made to coincide in parity with the number of "1" when the bit row is already modulated at every unit of modulation.

Further, in the 17PP modulation for the BD disc, the bit row not yet modulated is converted into a 3/2 times-longer bit row.

Format of a Unique ID

Next, the format of a unique ID will be explained.

(Unique-Id Format)

A unique ID is generated for each optical disc 1, formed to have a predetermined format and recorded on the optical disc 1.

The unique ID has a format which will be explained in detail below:

First, a real-data part of the unique ID as shown in FIG. 13A is divided into data blocks each of 160 bytes.

Next, a one-byte data block number is appended to the top of each 160-byte data block as shown in FIG. 13B. The data block number is a number appended to each of the data blocks.

Then, dummy data of 51 bytes is appended before the data block number and an error-detecting code (EDC) of 4 bytes is appended after the 160-byte data block to provide data of 216 bytes in total as shown in FIG. 13C. The 51-byte dummy data are all "FF".

Finally, an error-correcting code (ECC) of 32 bytes is appended after the data unit of 216 bytes. The algorithm for calculating the error-detecting code and error-correcting code is the same as for the aforementioned ordinary user data. Therefore, for error detection and error correction of a unique ID, the same circuit as for the user data can be used.

The unique ID is recorded by transcribing a pit/land pattern as in the ordinary format by a stamper and then irradiating high-power laser light (lasering) to a land in a predetermined position of a specific physical cluster in the recording track for transition to a pit.

The recording format for the unique ID is as follows:

The optical disc 1 has recorded thereon only data of 197 bytes (1576 bits) resulted from exclusion of the dummy data of 51 bytes at the top from the data of 216 bytes+32 bytes shown in FIG. 13C (see FIG. 13D). The dummy data has been appended for coincidence with the error-correcting code for the main data on the assumption that the length of the error-correcting code is 248 bytes, and it is already-known data which is all "FF". Thus, the dummy data has not to be recorded on the optical disc.

The data group of 197 bytes (1576 bits) is divided into four unique ID units each of 394 bits as shown in FIG. 13E. One of the unique ID units (394 bits) is recorded in one physical cluster.

The physical cluster in which the unique ID unit (of 394 bits) is recorded is a specific one of the physical clusters on the optical disc 1. That is, the address of the physical cluster to which the unique ID is appended is predetermined or the position where the unique ID is to be recorded is recorded in a management area or the like on the optical disc 1, and can thus be recognized at the player side.

Further, the user data (a series of information except for BIS, EDC and ECC clusters) included in the specific physical cluster where the unique ID is to be recorded and not yet subjected to 17PP modulation is given a predetermined value. For example, the user data is a data row whose bits are all zero (0) and which is not yet scrambled. Thus, the content of user data in the specific physical cluster with any unique ID not yet appended can be pre-recognized at the player side.

Figure 14:
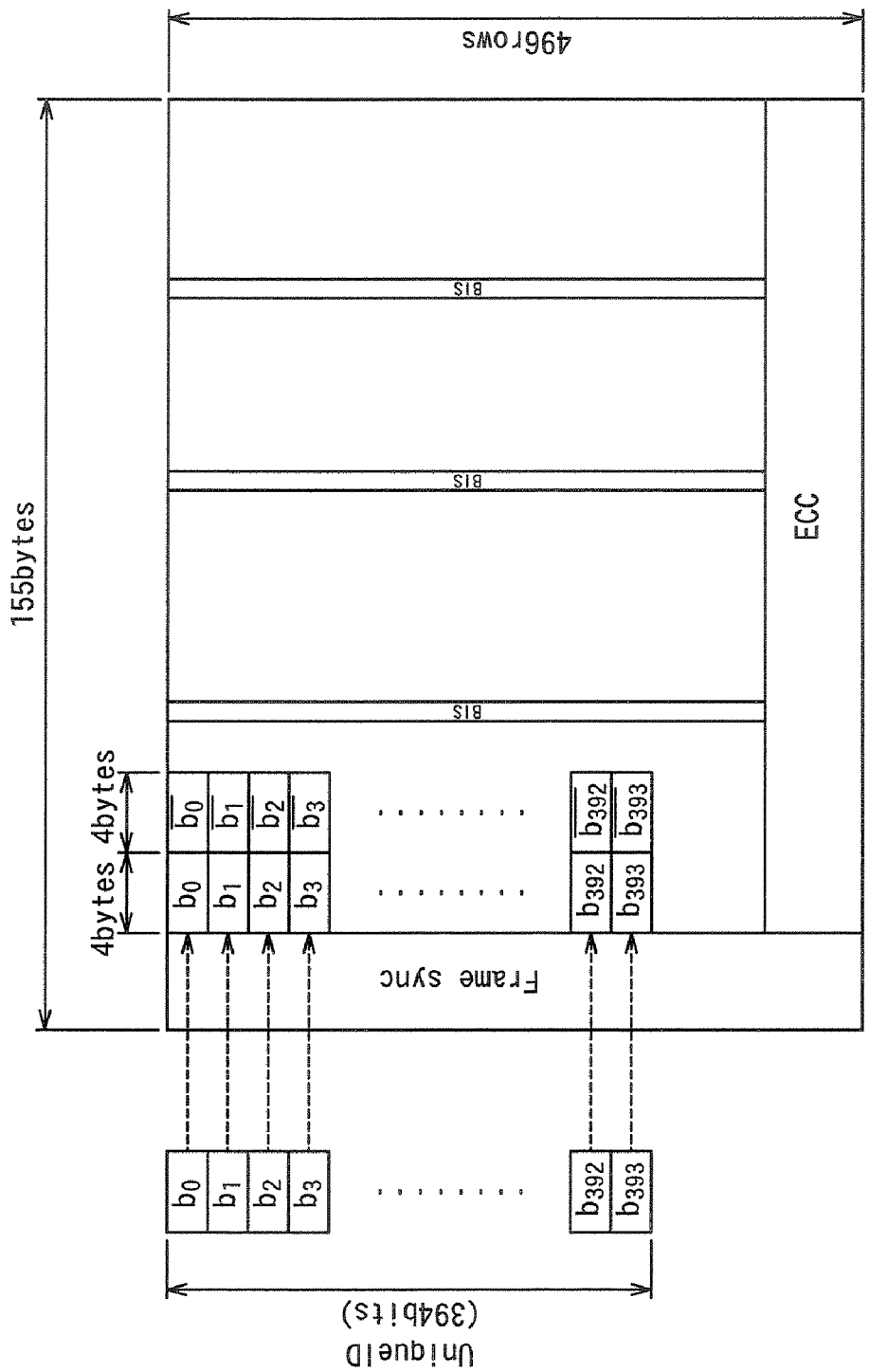
FIG. 14 shows a position on the physical cluster where the unique ID is written.

FIG. 14 shows a position where a unique ID (unique ID unit) of 394 bits in the specific physical cluster is recorded.

Each of the 394 bits included in the unique ID unit has appended thereto one data frame (of 155 bytes, not yet modulated) in the physical cluster. The value of each bit in the unique ID unit (0 or 1) is recorded in a corresponding data frame. That is, each of the 394 data frames of a total of 496 data frames included in a physical cluster has recorded therein the value of each bit included in the unique ID unit (of 394 bits).

Although an error-correcting code (ECC) is included in a data frame at the latter portion of a physical cluster, the data frame including the error-correcting code (ECC) has not recorded therein any bit value of the unique ID unit.

Figure 15:
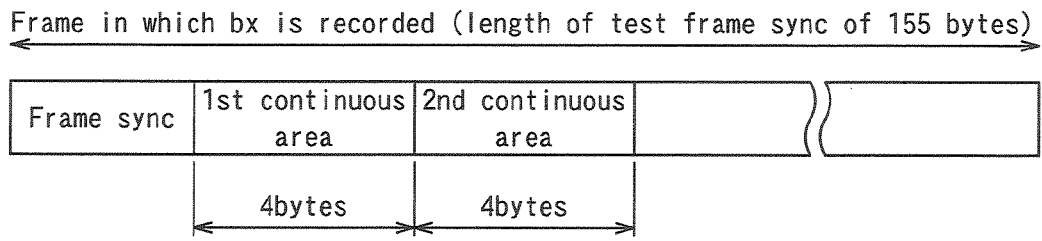
FIG. 15 shows a recording area in the data frame where the unique ID is recorded.

FIG. 15 shows a data frame in which one arbitrary bit ($b_x$) in the unique ID is to be recorded.

The data frame in which a unique ID is to be recorded has a first continuous area 11 of 4 bytes following the frame sync and a second continuous area 12 of 4 bytes following the first continuous area 11 as shown in FIG. 15. It should be noted that the successive "four bytes" means the four bytes before subjected to the 17PP modulation.

(Recording and Reading of Unique ID)

Figure 16A:
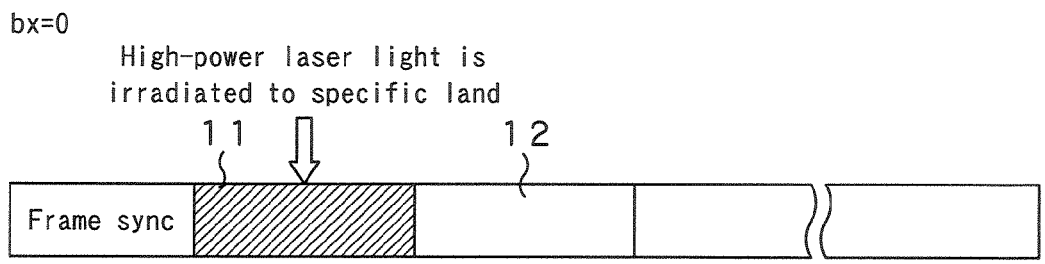
FIGS. 16A and 16B show an area where the data frame is written when the bit content is "0" and area where the data frame is written when the bit content is "1".

The one arbitrary bit ($b_x$) of the unique ID is recorded in the data frame in which the above two continuous areas 11 and 12 are set as will be explained below:

In case the bit $b_x$ of the unique ID is "0", high-power laser light is irradiated to a specific land in the first continuous area 11 for transition to a pit as shown in FIG. 16A.

Figure 16B:
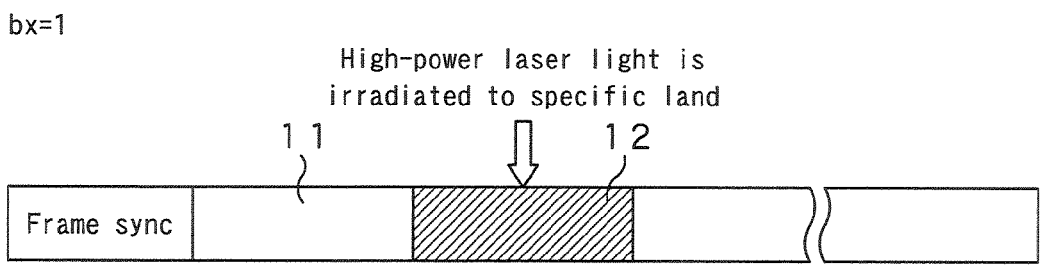

On the other hand, in case the bit $b_x$ of the unique ID is "1", high-power laser light is irradiated to a specific land in the second continuous area 12 for transition to a pit as shown in FIG. 16B.

It should be noted here that a land, irradiated with laser light for transition to a pit, of the successive four bytes is such that "even if the land is irradiated with laser light for transition to a pit, all bits of the land including a preceding bit row and following bit row will provide a bit row complying with the 17PP modulation and NRZI conversion rules". Such a land will be referred to as "specific land" hereunder.

For recording a unique ID, the position of "a specific land" is located in advance in each of the first and second continuous areas 11 and 12, any one of the first and second continuous areas 11 and 12 is selected depending upon whether the bit value of the unique ID is 0 or 1 and the specific land in the selected continuous area is transited to a pit.

It should be noted that more than one specific land may be transited to pits if they are included in the same continuous area. That is, a plurality of specific lands in the continuous areas may be transited to pits, respectively.

The land/pit pattern is forcibly changed by irradiating high-power laser light to the "specific land" for transition to a pit as above. It should be noted however that the land/pit pattern thus forcibly changed complies with the 17PP modulation and NRZI conversion rules.

Thus, also after appending a unique ID by irradiation of high-power laser light, the land/put pattern in the specific physical cluster can be read from the optical disc 1 and normally demodulated from the states of NRZI conversion and 17PP modulation.

On the assumption that the land/pit pattern can thus normally demodulated, an ordinary reading circuit can be used to read any user data from the specific physical cluster having the unique ID recorded therein. When any user data can thus be read, it is possible to detect in which an error has occurred, first or second continuous area 11 or 12, by making a comparison between the user data thus read and demodulated and original data (which is all zero, for example) to be read from the land/pit pattern having a unique ID not yet appended, namely, whether the read and demodulated user data is different from the original data.

That is, if an error has occurred in the first continuous area 11 of a data frame, the bit value of a unique ID corresponding to the data frame is "0". On the contrary, when an error has occurred in the second continuous area 12, the bit value of the unique ID is "1".

Therefore, a circuit that can read and demodulate ordinary user data may be used to detect, in the optical disc 1, a unique ID appended by irradiation of high-power laser light as above.

However, if data read from a physical cluster having a unique ID appended thereto is subjected to error correction, the unique ID will lose its bit value. On this account, for detecting a unique ID, it is necessary to cancel the error-correcting function.

Figure 17:
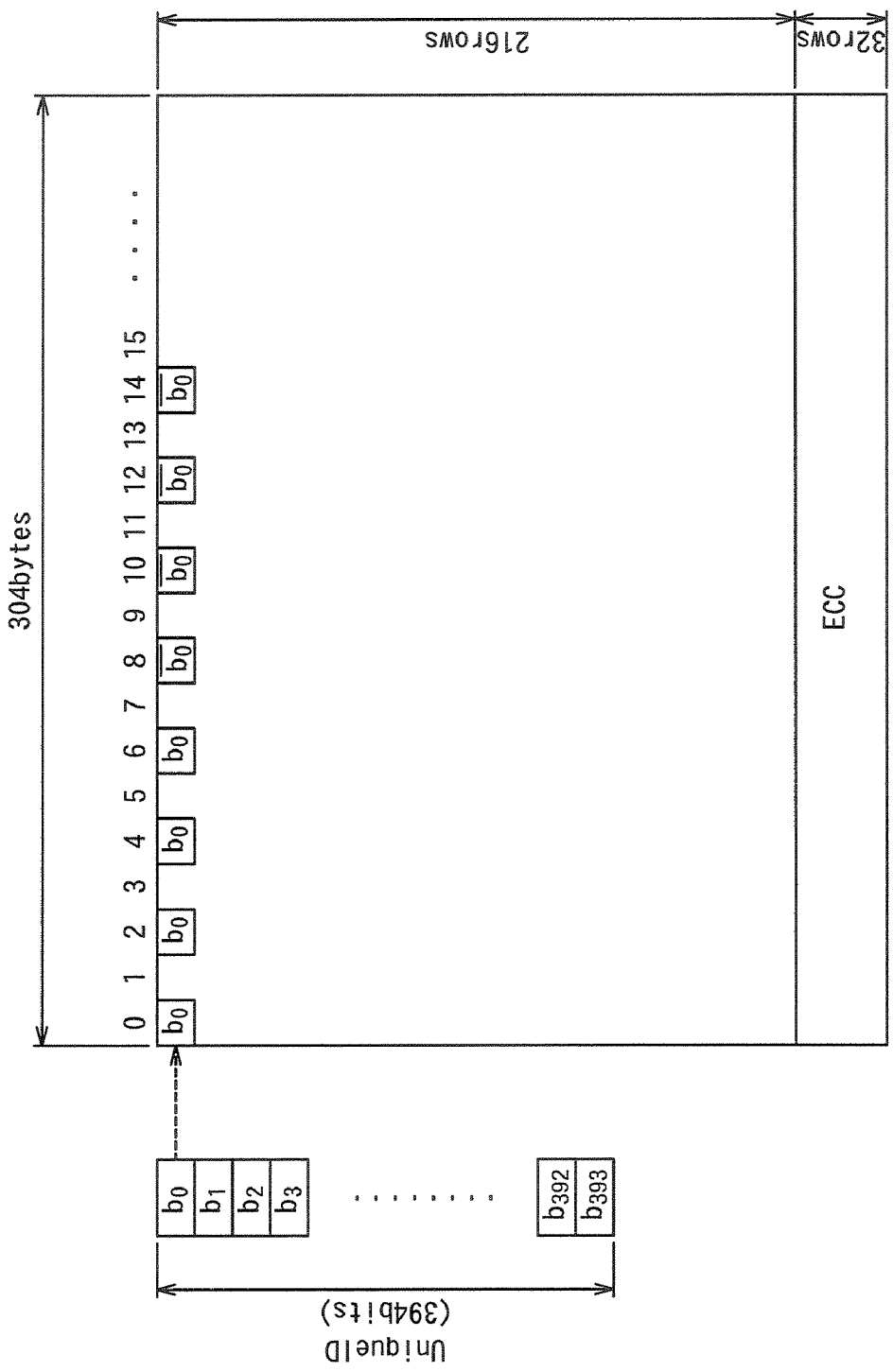
FIG. 17 shows a byte position on a logic block including a first bit ($b_0$) of a unique ID unit (394 bits).
Figure 18:
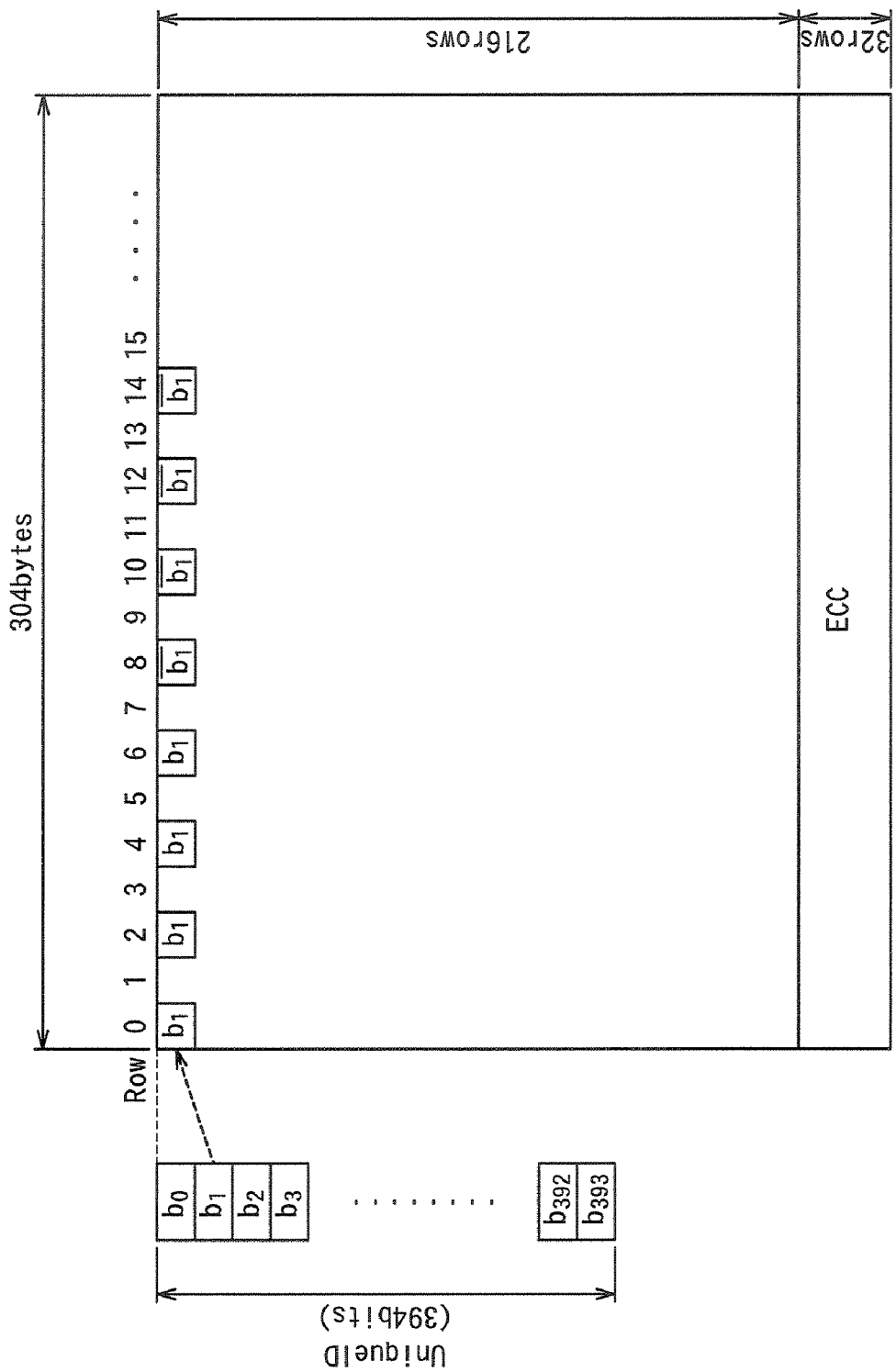
FIG. 18 shows a byte position on a logic block including a second bit ($b_1$) of the unique ID unit (394 bits).
Figure 19:
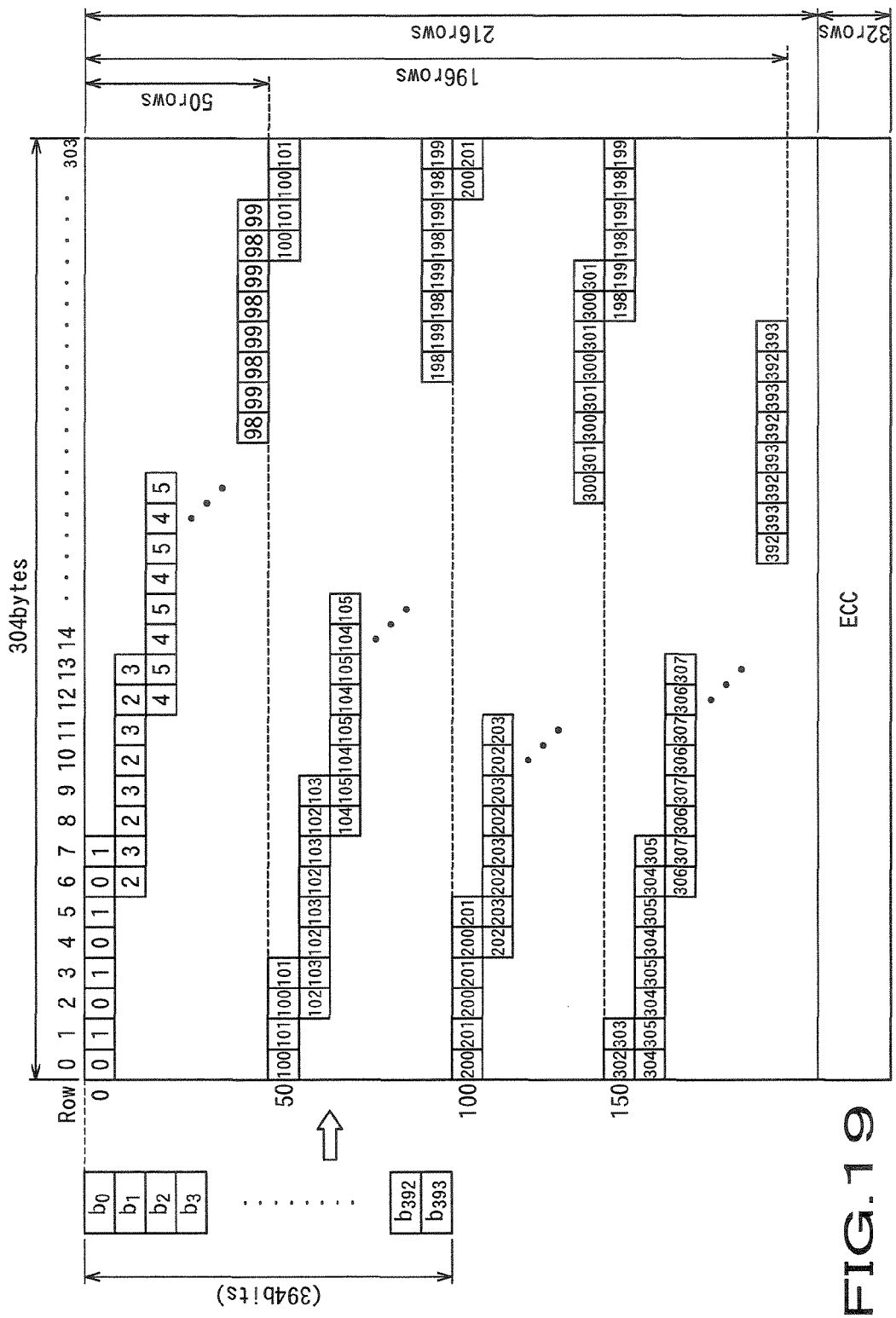
FIG. 19 shows a byte position on a logic block of each bit in the unit ID unit (394 bits).

The unique ID thus written in the physical cluster can be read as will be described below:

FIGS. 17, 18 and 19 show a logical block (ECC block: data of 304 bytes×(216 lines+32 lines) when the EDC and ECC are appended to a specific physical cluster) of data read from the specific physical cluster and subjected to the NRZI conversion and 17PP modulation.

The first bit ($b_0$) of the unique ID unit (of 394 bits) is stored at the zeroth, second, fourth, sixth, eighth, tenth, twelfth and fourteenth bytes in the first line of logical block as shown in FIG. 17. The first four bytes (zeroth, second, fourth and sixth bytes) are read from the first continuous area 11, and the last four bytes (eighth, tenth, twelfth and fourteenth bytes) are read from the second continuous area 12.

Therefore, by deciding whether the zeroth, second, fourth and sixth bytes in the logical block after demodulated are different from those in the original data (whether they are not 0 in case the original data are all 0) or the eighth, tenth, twelfth and fourteenth bytes are different from those in the original data (whether they are not 0 in case the original data are all 0), it is possible to detect a bit value corresponding to the first bit in the unique ID unit.

The second bit ($b_1$) of the unique ID unit (of 394 bits) is stored at the first, third, fifth, seventh, ninth, eleventh, thirteenth and fifteenth bytes in the first line of the logical block as shown in FIG. 18. The first four bytes (first, third, fifth and seventh bytes) are read from the first continuous area 11, and the last four bytes (ninth, eleventh, thirteenth and fifteenth bytes) are read from the second continuous area 12.

Therefore, by deciding whether the first, third, fifth and seventh bytes in the logical block after demodulated are different from those in the original data (whether they are not 0 in case the original data are all 0) or the ninth, eleventh, thirteenth and fifteenth bytes are different from those in the original data (whether they are not 0 in case the original data are all 0), it is possible to detect a bit value corresponding to the second bit in the unique ID unit.

FIG. 19 shows byte positions, in the logical block, of 4-byte data read from the first continuous area 11 in relation to all the bits in the unique ID unit (of 394 bits). It should be noted that the numerals indicated in the byte positions in the logical block in FIG. 19 correspond to the bit numbers in the unique ID unit.

As shown in FIG. 19, a 6-byte shift is made at each shift of one line by interleaving.

By deciding, with reference to each byte position as shown in FIG. 19, whether the byte positions in the logical block are different from those in the original data (whether they are not 0 in case the original data are all 0), it is possible to detect each bit value corresponding to the unique ID.

(Reason for the Continuous Area Being of 4 Bytes in Length, and Others)

The continuous areas (first and second continuous areas 11 and 12) in a data frame in which one bit in a unique ID is appended by the lasering has a length of 4 bytes as in the above explanation. However, the byte length of the continuous area may be larger.

The continuous area is of 4 bytes in length for the following reason.

For appending a unique ID by this method described herein by way of example, it is necessary that there should exist the aforementioned "specific lands" in the continuous areas when the land/pit pattern is formed by a stamper. However, if the continuous area is too short (the area is of one byte in length, for example), no such "specific land" will not possibly be formed in the continuous area. Therefore, the continuous areas should have a sufficient continuous length for the specific land to occur in any position (anywhere) in the continuous area.

Making the 17PP modulation of many random data patterns, the Inventors of the present invention conducted experiments on how long the continuous area should be for the "specific land" as shown in FIG. 3 to occur in the continuous area with a high probability. The results of the experiments proved that a highly useful "specific land" would be formed in a continuous area of 4 bytes or more whatever pattern the sequence of original data defines.

Thus, the continuous area (first and second continuous areas 11 and 12) in the data frame is of 4 bytes or more herein.

It should be noted that "specific lands" of 2 types as shown in FIGS. 2 and 3 are possible. Firstly, in the specific land shown in FIG. 2, since a "pit-land-pit" pattern exists on the disc, irradiation of high-power laser light will transit all the pits around the disc portion to lands. Secondly, in the specific land shown in FIG. 3, since a pit and land, relatively long (of 4T or more, for example), exists adjacently to the disc, irradiation of high-power laser light to the boundary between the pit and land will shift the pit-land boundary by a predetermined number of clocks.

The aforementioned embodiment of the present invention is applied to recording of a unique ID to the one, as shown in FIG. 3, of the two types of "specific lands". An embodiment applied to recording of a unique ID to the other type of "specific land" shown in FIG. 2 will be explained later.

Figure 20:
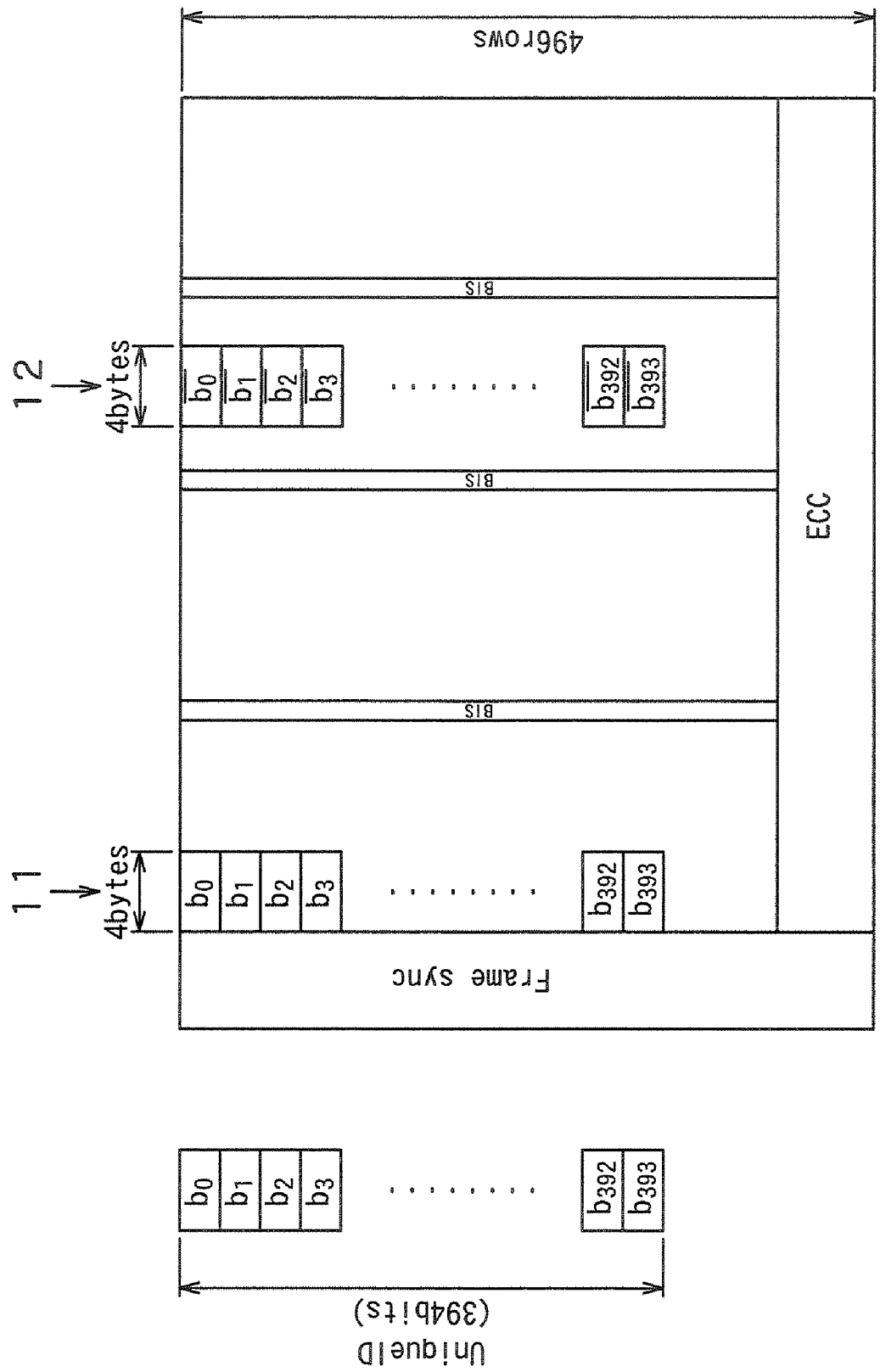
FIG. 20 shows a physical frame when no continuous area exists in an area following the frame sync.

Also, the continuous areas (first and second continuous areas 11 and 12) are set next to frame sync. This is intended for utilization of the feature of the frame sync in that the 17PP modulation and NRZI conversion thereof results in a predetermined pattern to facilitate the lasering to append a unique ID and detection of the unique ID and limit the influence of an error caused by dust or the like from spreading to the continuous areas. It should be noted however that the continuous areas may not necessarily be provided just after frame sync but may be set in other locations in the data frame as shown in FIG. 20.

Also, in this embodiment, two continuous areas are provided in the data frame, one in which all bits are zero (0) and the other in which all bits are one (1), by way of example. However, this example is not any limitative one, but only one continuous area may be set in the data frame and the specific land in the continuous area is transited to a pit when the bit value is 0 while it is not subjected to the lasering for unique-ID appending when the bit value is 1.

Also, ECC as well as an error-detecting code (EDC) is recorded in the physical cluster. ECCs are recorded intensively in data frames in a latter half of the physical cluster, while EDCs are recorded dispersedly in the physical cluster. Appending a unique ID should desirably not be made to the EDCs dispersed in the physical cluster.

Figure 21:
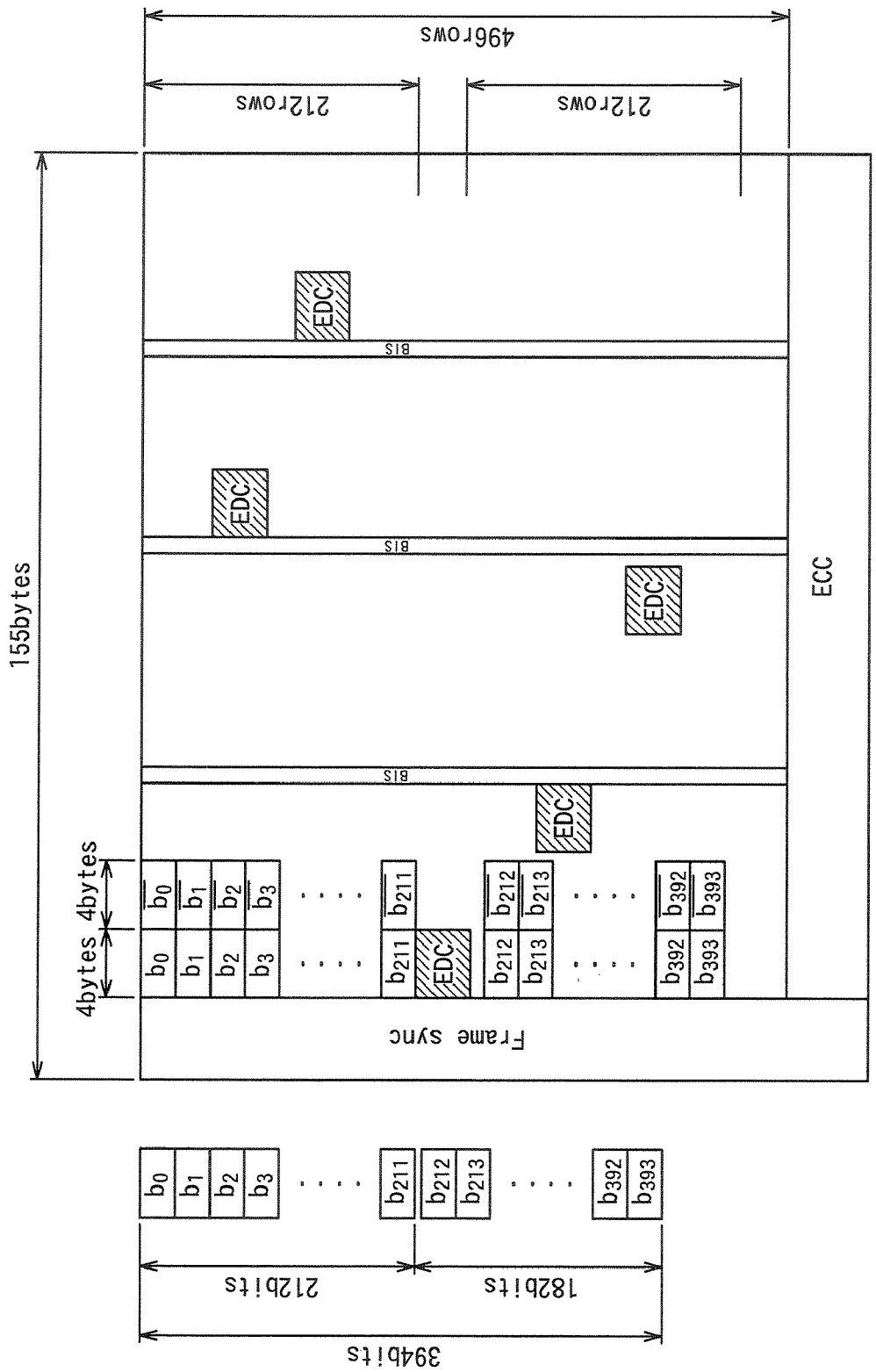
FIG. 21 shows a physical frame having a continuous area provided therein to avoid EDC.

On this account, in case the recorded positions of EDC overlap the positions of the continuous areas as shown in FIG. 21, bits in a unique ID should desirably not be put in correspondence with the data frame in the optical disc 1.

By appending a unique ID where no EDC exists, an error will be detected where EDC exists, if any.

Production of the Optical Disc

Next, the process of producing the aforementioned optical disc 1 will be explained below with reference to FIG. 22.

To produce an optical disc 1, a step S11 of formatting is first effected. The formatting step S11 is performed by a computer or the like.

In the formatting step S11, there are entered content data (user data) to be recorded on an optical disk 1 and user data (base data) to be pre-recorded to a specific physical cluster on which a unique ID is to be recorded.

Also, in the formatting step S11, the input content data and base data are converted into a data row in a format for a BD disc. More specifically, there are effected appending of an error-correcting code (EDC), scrambling, appending of a parity code, interleaving and appending of a BIS cluster.

It should be noted here that the base data include 64 bytes all of zero (0). That is, the user data in the physical cluster in which a unique ID is to be recorded is all 0. However, since the scrambling is made in the formatting step S11, the data row not yet subjected to the 17PP modulation varies from one location to another and thus is not all 0 before the lasering for appending of a unique ID. It should be noted that although in this embodiment, the base data is a data row which is all 0, it may be a specific data row.

It should also be noted that at this time, the base data is formatted with a BIS cluster and the like being appended for recording in a physical cluster at a specific address on the physical disc 1. That is, the base data is so formatted as to be recorded on the specific physical cluster in which a unique ID is to be recorded.

Next, a step S12 of variable-length modulation is effected.

The variable-length modulation step S12 is performed by a computer or the like. In the variable-length modulation step S12, the data row formatted in step S11 is entered. In this step S12, the input data row is subjected to the 17PP modulation and NRZI conversion to generate a modulated bit row. A 0/1 pattern of the bit row is a pit/land pattern formed on the recording track of the optical disk 1.

Next, a step S13 of forming a disc master is effected.

In the disc mater forming step S13, a glass master is coated with photoresist and laser light is irradiated in the pit/land pattern formed as above to the coated photoresist to form a convex-concave pattern along the recording track. Then, the photoresist having the convex-concave pattern formed thereon is developed and fixed on the glass master, and the glass master is electrolytically plated on the surface thereof to form a metal master 14.

Then, a step S15 of molding disks is effected.

In the disk molding step S15, a stamper is made using the metal master 14 formed as above, it is disposed in a molding die, and an injection molding machine is used to form many disc substrates 16 from a transparent resin such as polycarbonate or the like.

Thus, each of the disk substrates 16 thus produced has formed along the recording track thereof a land/bit pattern corresponding to the bit row generated in the variable-length modulation step S12.

Next, a step S17 of appending a unique ID is effected.

In the unique-ID appending step S17, a UID writing apparatus 20 is used to additionally record a unique ID generated for each of media to each of the many disk substrates 16 thus produced.

The UID writing apparatus 20 is to additionally record a unique ID to each of the many same optical disks 1 thus produced.

Figure 23:
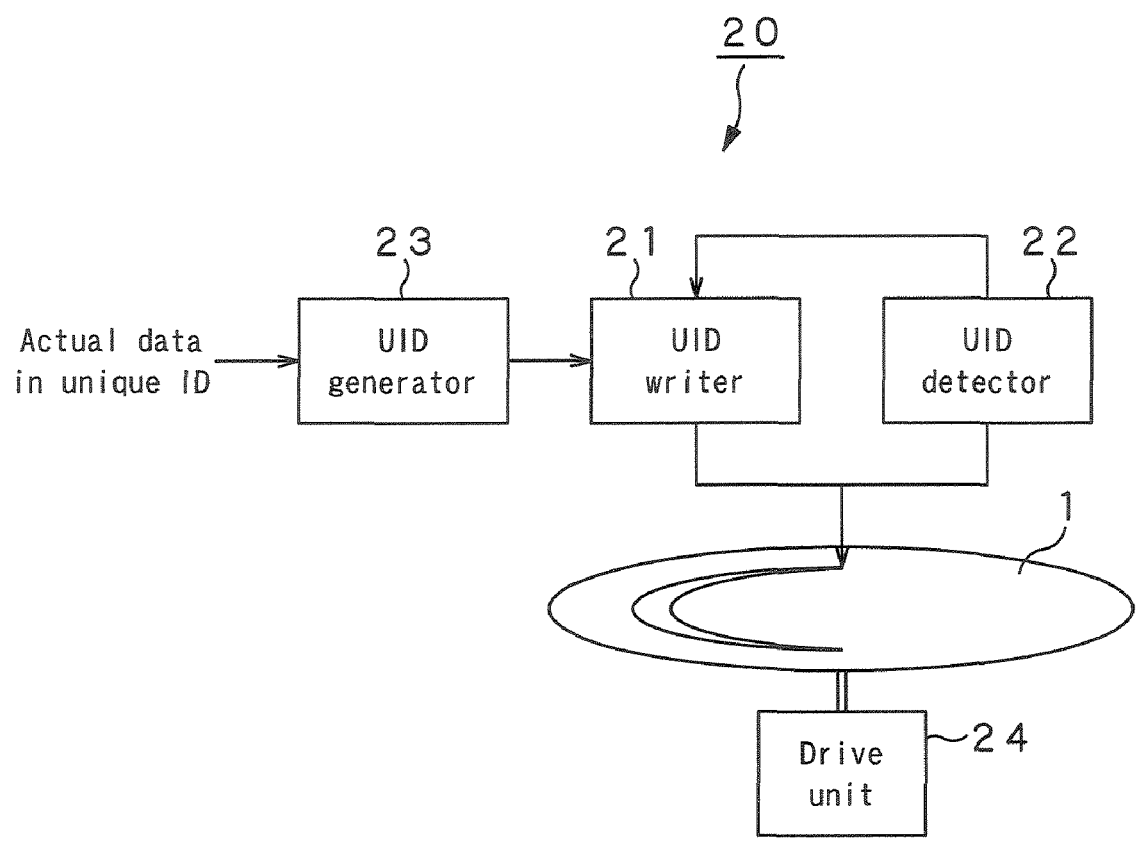
FIG. 23 is a block diagram of an UID writing apparatus.

The UID writing apparatus 20 includes, for example, a UID writer 21 that irradiates laser light having a power sufficiently higher than the normal reading power level to the optical disc 1 to append each bit in the unique ID, a UID detector 22 that detects positions where there are written bits in unique IDs for a specific physical cluster, data frame, specific land, etc., respectively, a UID generator 23 that generates a unique ID, a drive unit 24 that rotates the optical disc 1, etc., for example, as shown in FIG. 23.

The UID writer 21 decides, based on a bit row in a unique ID generated by the UID generator 23, to which laser light should be irradiated, a specific land in the first continuous area or in the second continuous area.

The UID generator 23 is supplied with actual data of the input unique ID. The UID generator 23 appends an error-detecting code (EDC), error-correcting code (ECC), etc. to the input actual data to form these data into a predetermined format. Further, the UID generator 23 divides the formatted bit rows into bit rows each of 394 bits for each physical cluster, and supplies the bit rows to the UID writer 21.

In the above UID writing apparatus 20, the drive unit 24 rotates the optical disc 1. At this time, the laser light is traced along the recording track on the optical disc 1. The UID detector 22 has an internal memory that pre-stores a bit/land pattern recorded on the optical disc 1. The UID detector 22 makes a comparison between a pit/land pattern actually read from the optical disc 1 and a pattern recorded in the internal memory to detect a position of the laser light on the optical disc 1. Also, with a signal from the UID detector 22, it can be detected when the laser light has arrived as a specific land on the recording track.

When the UID detector 22 detects a specific land, the UID writer 21 irradiates high-power laser light. At this time, however, the UID writer 21 selects, based on a bit value supplied from the UID generator 23, either the first or second continuous area 11 or 12 in the data frame for irradiation of laser light to a specific land in the selected continuous area. That is, when a bit value "0" is to be recorded, the UID writer 21 will irradiate laser light to the first continuous area. On the other hand, when a bit value "1" is to be recorded, the UID 22 will irradiate laser light to the second continuous area.

The UID writer 21 records the bit value to each of data frames in a plurality of physical clusters set in the optical disc as above. Thus, a unique ID can be additionally recorded on the optical disc 1.

Through the above-mentioned steps S11 to S17, the optical disc 1 can be produced.

Production of the Optical Disc (by Other Method)

Figure 24:
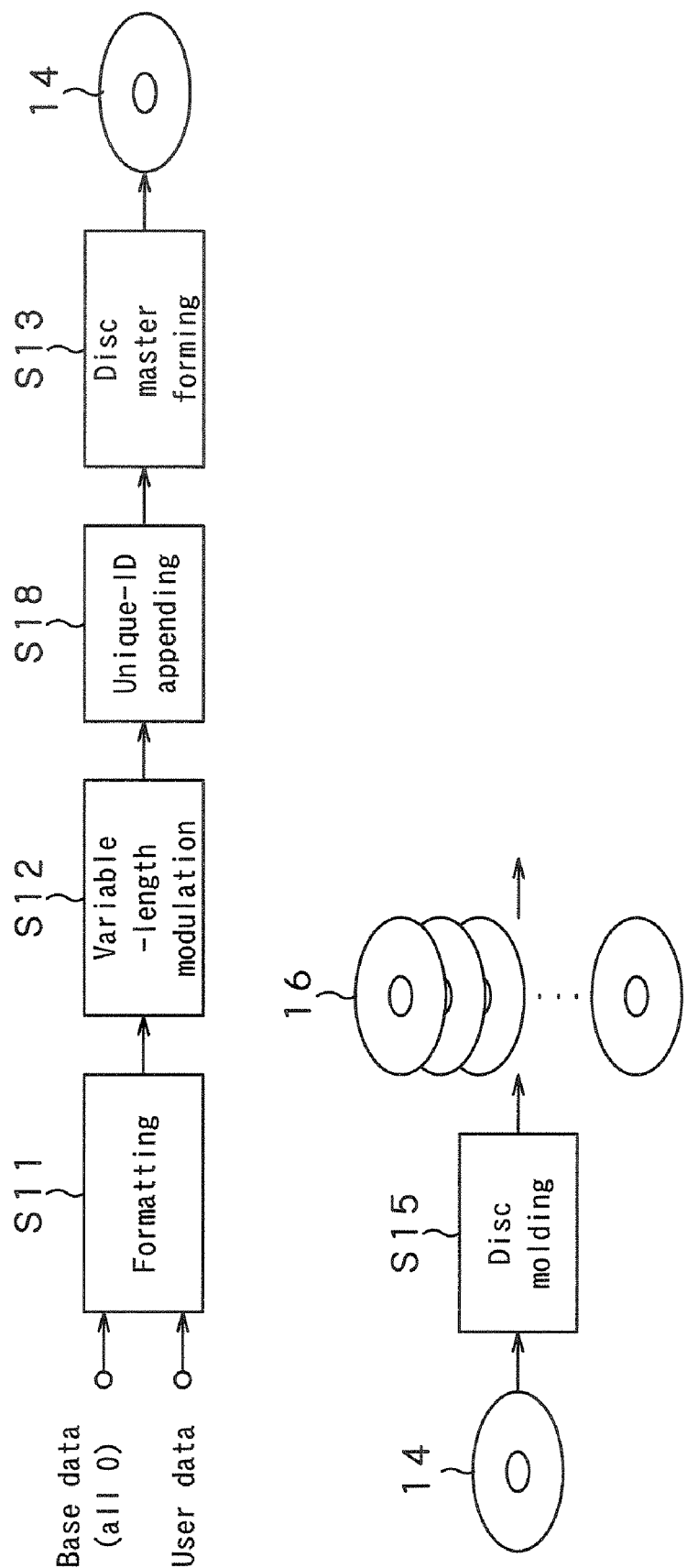
FIG. 24 shows a flow of optical disc producing processes when the unique ID is recorded by the pattern inversion.

An optical disc 1 having a unit ID appended thereto may be produced by effecting a process as shown in FIG. 24.

Figure 22:
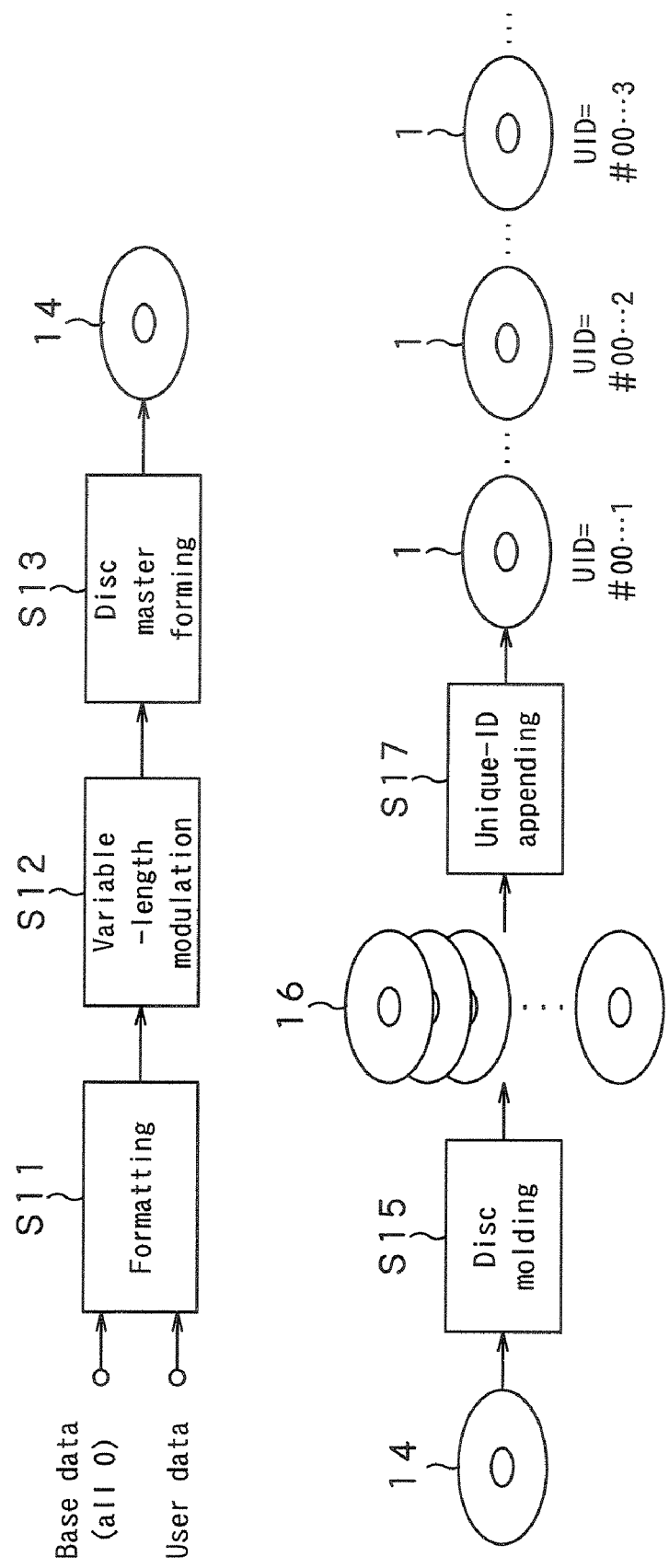
FIG. 22 shows a flow of optical disc producing processes when the unique ID is recorded by the lasering.

The optical disc producing process shown in FIG. 24 has a UID appending step S18 additionally provided between the variable-length modulation step S12 and disc master forming process S13 in the process shown in FIG. 22 with omission of the unique-ID appending step S17 next to the disc molding step S15 from the process shown in FIG. 22.

In the additionally provided unique-ID appending step S18, a specific land portion of one of the pit/land patterns supplied from the variable-length modulation step S12 is forcibly be transited to a pit (pattern inversion). Namely, in the newly provided unique-ID appending step S18, a unique ID is appended by signal processing before the disc master forming step S13, not physically by irradiation of laser light.

It should be noted that the logical and physical addresses of the unique ID are quite the same as those in the unique-ID appending by irradiation of laser light and the land (specific one) to be transited to a pit is also the same as that in the unique-ID appending by the laser light irradiation.

Since the unique-ID appending by the pattern inversion via the signal processing makes it unnecessary to irradiate laser light, a unique ID can easily be appended. Also, since the land of the optical disc 1 may not be formed from any material that can be melted, the freedom of selecting a material for the optical disc can be increased.

It should be noted that if a unique ID is appended by the pattern inversion via the signal processing, each of the optical discs cannot have any unique content. However, since the identifier may be changed for each title or from one sales territory or period to another even if the optical discs have the same content, the medium management can be made based on the identifier against pirating or illegal copying.

Also, a portion of a unique ID, common to all disc masters, may be appended by the pattern inversion via the signal processing while the other portion may be appended by the lasering.

Disc Player

Next, a player for the optical disc 1 having a unique ID appended thereto will be explained.

Figure 25:
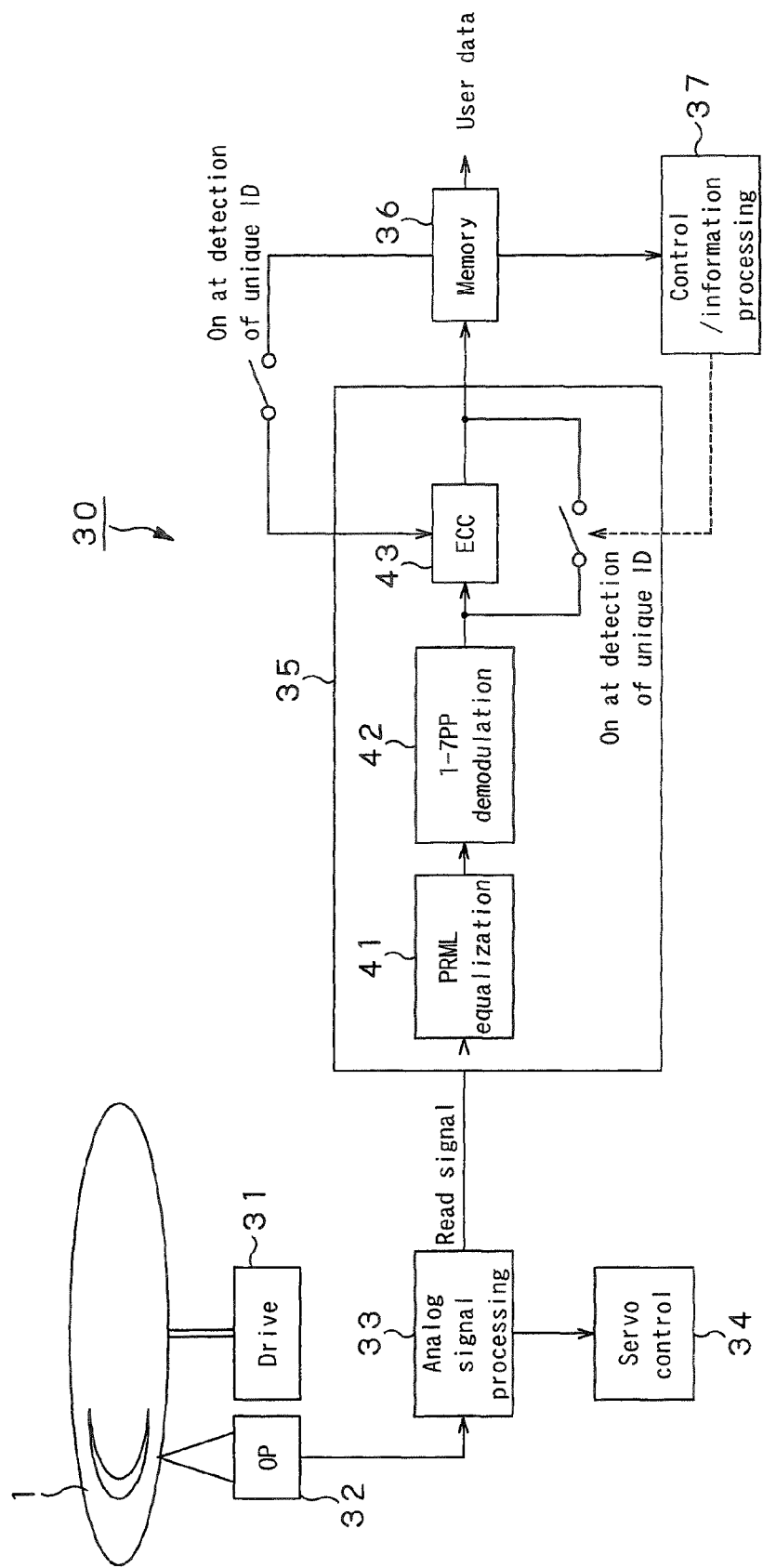
FIG. 25 is a block circuit diagram of an optical disc player.

FIG. 25 is a block diagram of a disc player, generally indicated with a reference numeral 30, which can play the optical disc 1 having a unique ID appended thereto.

The disc player 30 has a function to normally read content data in the BD disc and a function to read the unique ID.

It should be noted however that the hardware construction of the disc player 30 may be the same as that of a player capable of playing a normal BD disc having no unique ID additionally recorded therein. In other words, the unique ID having been explained above can be detected by an ordinary disc player having newly added thereto only firmware that performs the control function of the controller because the unique ID is embedded, with the ordinary variable-length modulation technique, in an information recording portion of the BD disc where a content is actually recorded, and the algorithms of the error-detecting code and error-correcting code are the same as the actual information (Player Construction)

The disc player 30 is constructed as will be explained in detail below:

As shown in FIG. 25, the disc player 30 includes a drive unit 31 that rotates the optical disc 1, an optical head 32 that irradiates laser light to the optical disc 1 and detects return light from the optical disc 1, an analog signal processing circuit 33 that generates control signals such as a read signal, focus error signal, etc. on the basis of a detection signal from the optical head (OP) 32, and a servo control circuit 34 that makes a variety of servo control on the basis of the control signals generated by the analog signal processing circuit 33.

The disc player 30 further includes a read data processing unit 35 that processes a signal read from the optical disc 1, a memory 36 that stores user data read by the read data processing unit 35, and a control/information processing unit 37 that controls the entire disc player 30 and makes a variety of information processing.

The read data processing unit 35 is supplied with a recording track read signal from the analog signal processing circuit 33, that is, a signal corresponding to a pit/land pattern on the recording track.

The read data processing unit 35 includes a PRML equalization circuit 41 that makes PRML (partial response maximum likelihood) equalization and binarization of an input read signal, a decoding circuit 42 that makes NRZI conversion and 17PP modulation of a PRML-equalized read data row, and an ECC decoder 43 that makes error correction of an output from the decoding circuit 42.

(Normal Reading)

The above read data processing unit 35 operates as follows for reading ordinary content data:

The read data processing unit 35 reads a clock from a pit/land pattern signal read by the optical head 32 from the optical disc 1 being rotated, and makes PRML equalization, 17PP demodulation and error correction of the clock to reproduce information recorded in the optical disc 1. The information reproduced by the read data processing unit 35 is stored once in the memory 36 and supplied to outside.

(Detection of Unique ID)

Also, the read data processing unit 35 operates as follows for detection of a unique ID:

First, the control/information processing unit 37 supplies the servo control circuit 34 with the address of a specific physical cluster having a unique ID recorded therein and gives the servo control circuit 34 a command for reading the specific physical cluster. Supplied with the read command, the servo control circuit 34 controls the drive unit 31 and optical head 32 to start reading information recorded in the designated physical cluster.

The read data processing unit 35 reads a clock from a pit/land pattern signal read by the optical head 32 and makes PRML equalization and 17PP demodulation of the clock to detect information recorded in a specific physical cluster in the optical disc 1. The information detected by the read data processing unit 35 is stored in the memory 36.

At this time, the data row demodulated from the 17PP-modulated state is stored into the memory 36 as it is without being subjected to error correction. Also, the information stored in the memory 36 is not supplied to outside.

The control/information processing unit 37 has the ECC decoder 43 make error correction of the unique ID with reference to the data read from the specific physical cluster and stored in the memory 36 to detect the content of the unique ID recorded in the optical disc 1.

That is, the control/information processing unit 37 makes a comparison between information stored in the memory 36 and original data having no unique ID yet appended thereto (data of all 0, for example) to detect a difference of the information from the original data and thus determine the content of the unique ID.

Having detected the unique ID, the control/information processing unit 37 makes a variety of operations on the basis of the content of the unique ID.

(Detection of Unique ID by Majority Decision)

In this embodiment, when the bit value of the unique ID is 0, the specific land in the first continuous area 11 of a corresponding data frame is transited to a pit. On the contrary, when the bit value is 1, the specific land in the second continuous area 12 is transited to a pit. That is, it may be said from the standpoint of the player side that if any error has occurred in the first continuous area 11, the bit value of the corresponding unique ID is 0 while if any error has occurred in the second continuous area 12, the bit value of the corresponding unique ID is 1.

Figure 26:
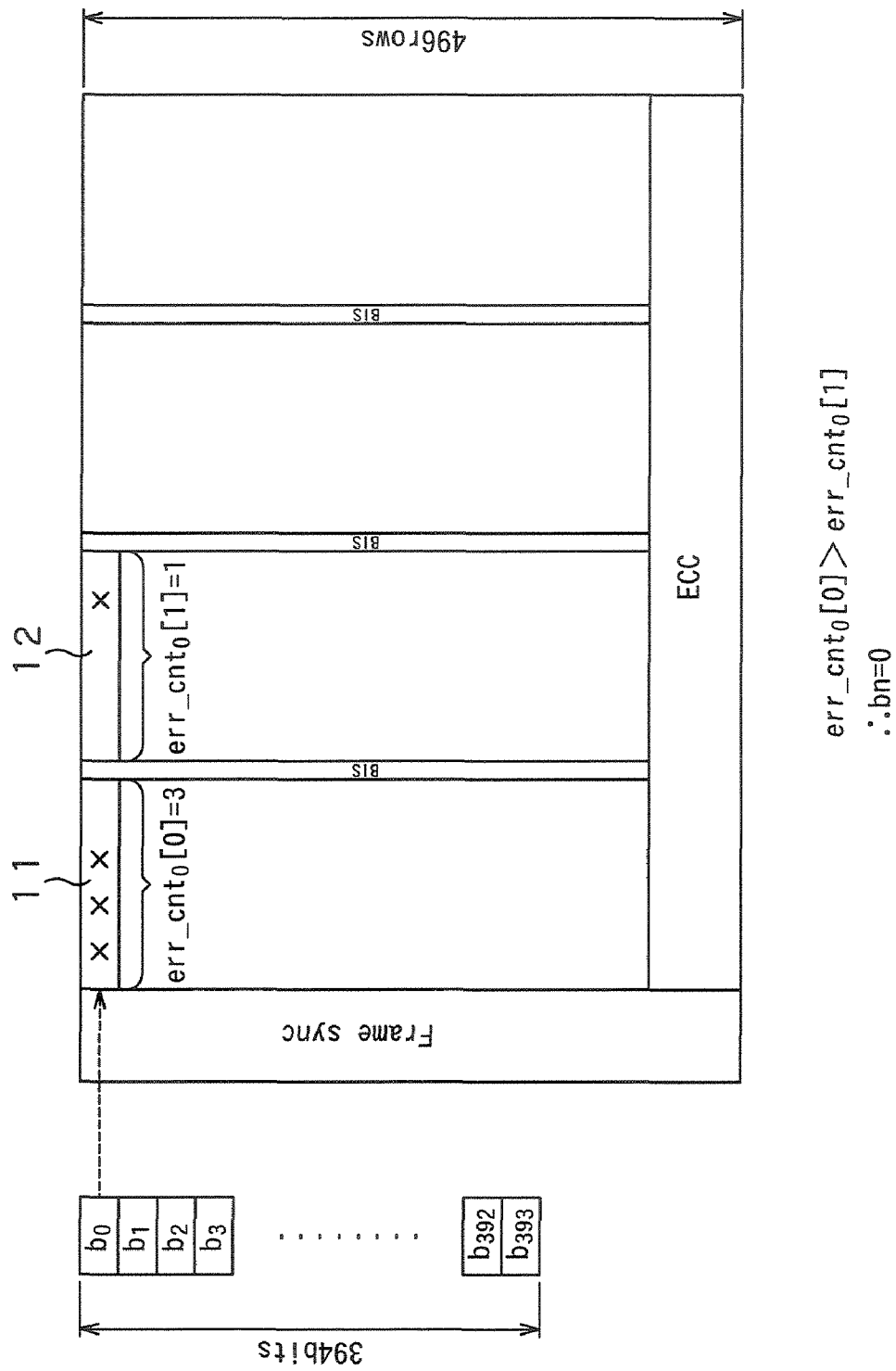
FIG. 26 shows the number of errors taking place in the physical frame when determining the bit value through comparison in numbers of errors between the physical frames.

Thus, by making a comparison between the number of errors (err_cnt0[0]) detected in the first continuous area 11 and the number of errors (err_cnt0[1]) detected in the second continuous area 12 as shown in FIG. 26, the bit value can be determined with an improved accuracy.

Figure 27:
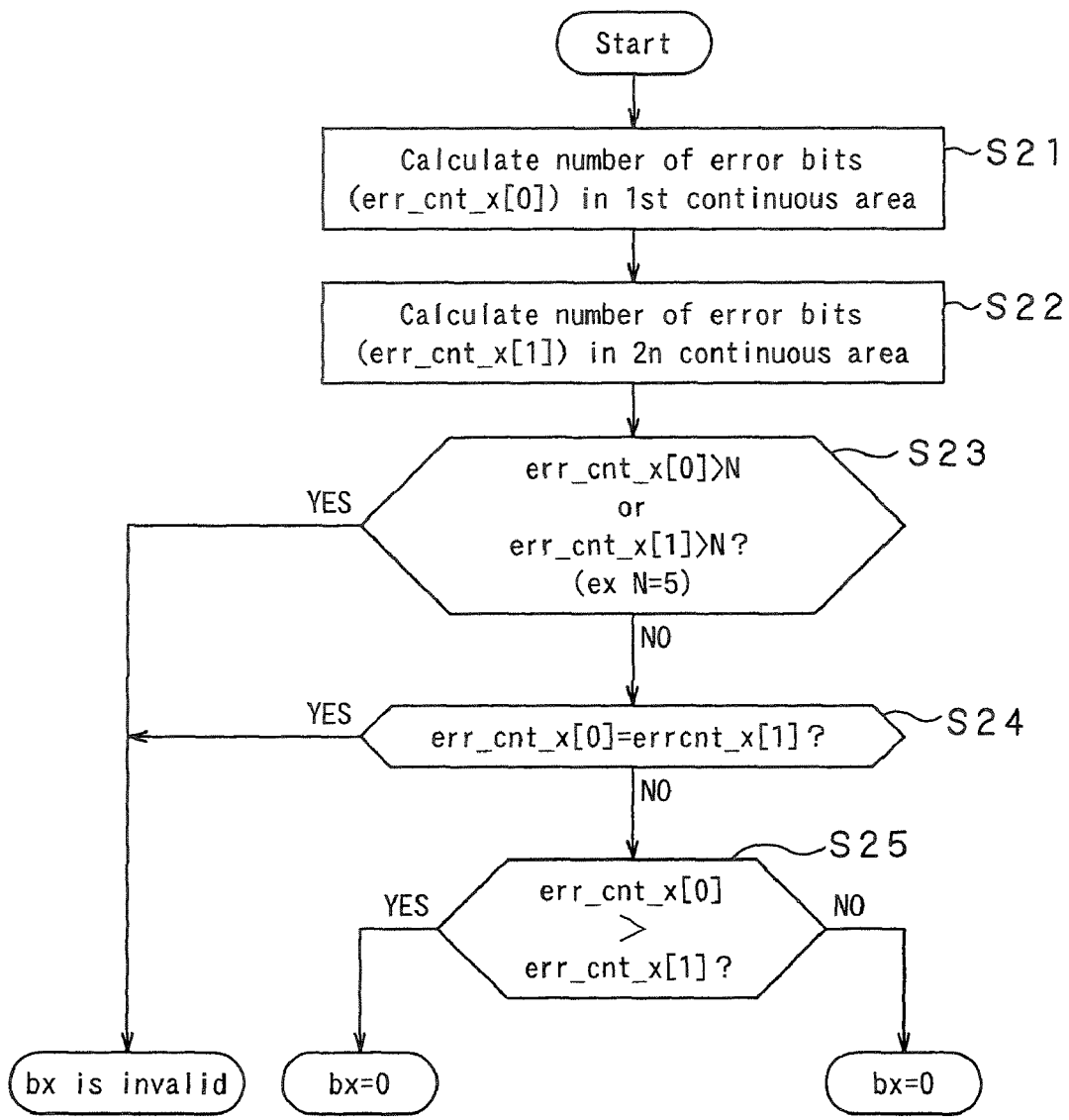
FIG. 27 shows a flow of operations made in determining the bit value through comparison in numbers of errors between the physical frames.

The flow of determination process will be explained below with reference to FIG. 27.

For determining the value of an arbitrary one bit (bit $b_x$) in the unique ID, the control/information processing unit 37 starts operating in step S21.

First in step S21, the control/information processing unit 37 calculates the number of error bits (number of bits different from those in the original data) in a data row read from the first continuous area 11. It should be noted that the number of error bits in the first continuous area 11 is taken as err_cnt_x[0].

Next in step S22, the control/information processing unit 37 calculates the number of error bits (number of bits different from those in the original data) in a data row read from the second continuous area 12. It should be noted that the number of error bits in the second continuous area 12 is taken as err_cnt_x[1].

Next in step S23, the control/information processing unit 37 decides whether err_cnt_x[0]>N or err_cnt_x[1]>N (N is an arbitrary natural number; N=5, for example). In case err_cnt_x[0]>N or err_cnt_x[1]>N, that is, when the result of the decision made in step S23 is affirmative (YES), the control/information processing unit 37 will exit the process with concluding that the value of the bit $b_x$ is "invalid". This conclusion is made based on the following rule. Namely, in case a larger number of error bits than predetermined have occurred in any one (or in both) of the first and second continuous areas 11 and 12, it may be considered that a unique ID has illegally been changed. To inhibit such an illegal appending of a unique ID, the bits are decided to be invalid if a larger number of errors than predetermined have occurred.

In case it is not concluded in step S23 that err_cnt_x[0]>N or err_cnt_x[1]>N, namely, in case the result of the decision made in step S23 is negative (NO), the control/information processing unit 37 goes to step S24.

Next in step S24, the control/information processing unit 37 decides whether err_cnt_x[0]=err_cnt_x[1]. In case it is concluded in step S24 that err_cnt_x[0]=err_cnt_x[1], namely, when the result of the decision made in step S24 is affirmative (YES), the control/information processing unit 37 will exit the process with concluding that the value of bit $b_x$ is invalid. That is, in case the bit value cannot be determined, it is concluded that the bit itself is invalid.

In case it is not concluded in step S24 that err_cnt_x[0]=err_cnt_x[1], namely, when the result of the decision made in step S24 is negative (NO), the control/information processing unit 37 goes to step S25.

Next in step S25, the control/information processing unit 37 decides whether err_cnt_x[0]>err_cnt_x[1].

In case it is concluded in step S24 that err_cnt_x[0]>err_cnt_x[1], namely, when the result of the decision made in step S24 is affirmative (YES), the control/information processing unit 37 will exit the process with concluding that the value of the bit $b_x$ is "0".

In case it is not concluded in step S24 that err_cnt_x[0]>err_cnt_x[1], namely, when the result of the decision made in step S24 is negative (NO), the control/information processing unit 37 will exit the process with concluding that the value of the bit $b_x$ is "1".

OTHER EXAMPLE

The aforementioned method is simple but includes some problems. A method of overcoming the problems and implementing preferable recording of a unique ID will be explained below.

A first problem lies in the DC control bit. In the embodiment having been described above with reference to FIG. 14, a unique ID is recorded using 8 bits (4 bytes in two areas) just after frame sync. However, a DC control bit is inserted in this 8-bit area. Namely, even if a 17PP-modulated pattern is changed by recording a unique ID, the change of data after 17PP demodulation will not possibly spread over the DC control bit as the case may be. Since information carried by the DC control bit is thus removed and cannot be detected, it cannot possibly be detected as data on the unique ID.

Figure 28:
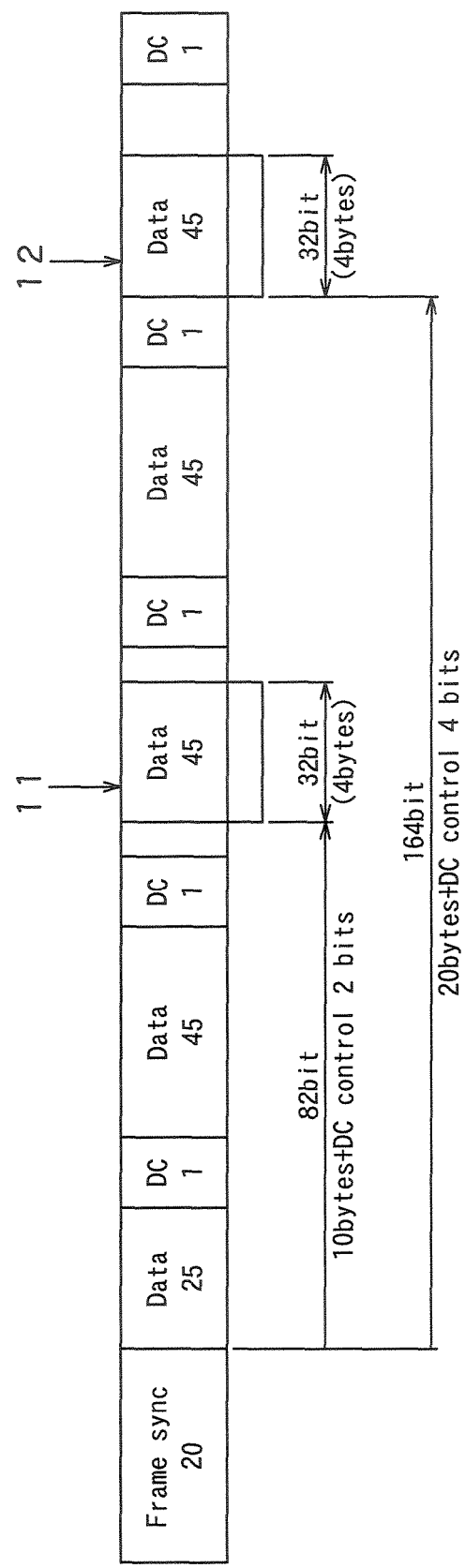
FIG. 28 explains a first variant of the embodiment in which PID is recorded to avoid a DC control code.

There will be explained a first variant of the aforementioned embodiment to solve the above problem. The first variant is to set both the first and second continuous areas 11 and 12 in an area not including any DC control bit as shown in FIG. 28.

More particularly, according to this first variant, the first continuous area 11 is positioned 82 bits after the frame sync. In this position, there are laid two DC control bits between the frame sync and first continuous area 11. The 17PP modulation is made in units of two bits. So, two (even number of) DC control bits thus inserted will not influence this separation of recorded data. Also, the first continuous area 11 is positioned 10 bytes after the frame sync. Since the recorded data is well separated even in units of a byte, it is possible to easily detect correspondence with the user data.

Also, in this first variant, the second continuous area 12 is positioned 164 bits away from the frame sync. With this positioning, the DC control bits will not influence the separation of the recorded data and also the recorded data can well be separated in units of a byte.

According to an example of the first variant, positioning of the first and second continuous areas 11 and 12 as above permits to stably detect a unique ID with elimination of the influence of the DC control bits and with calculation in units of a byte.

The second problem lies in the fact that only the pattern shown in FIG. 3 can be used as the "specific land" pattern.

According to another example of the first variant, the above problem can be solved to permit use of both the "specific lands" shown in both FIGS. 2 and 3, whereby the freedom of appending PID can be increased and the PID writer can be built more easily.

FIGS. 29 to 32 explain a second variant of the aforementioned embodiment to overcome the above problems.

According to the second variant, data (just before 17PP-modulated) to be recorded as base data in the first and second continuous areas 11 and 12 are prepared to be of four bytes: 87, 8F, 88 and 8A, and mastering is made to form a stamper and molded disc. When such base data has been 17PP-modulated and recorded in a 4-byte continuous recording area, a pattern resulted from NRZI conversion of a pattern "001 000 100 101 001 010 100 101 001 010 000 010 000 010 000 001" will be recorded on the disc.

With the above pattern, the "specific lands" shown in FIGS. 2 and 3 will occur so that an increased number of recording methods is available for use and thus the disc player can be constructed more simply.

Figure 29:
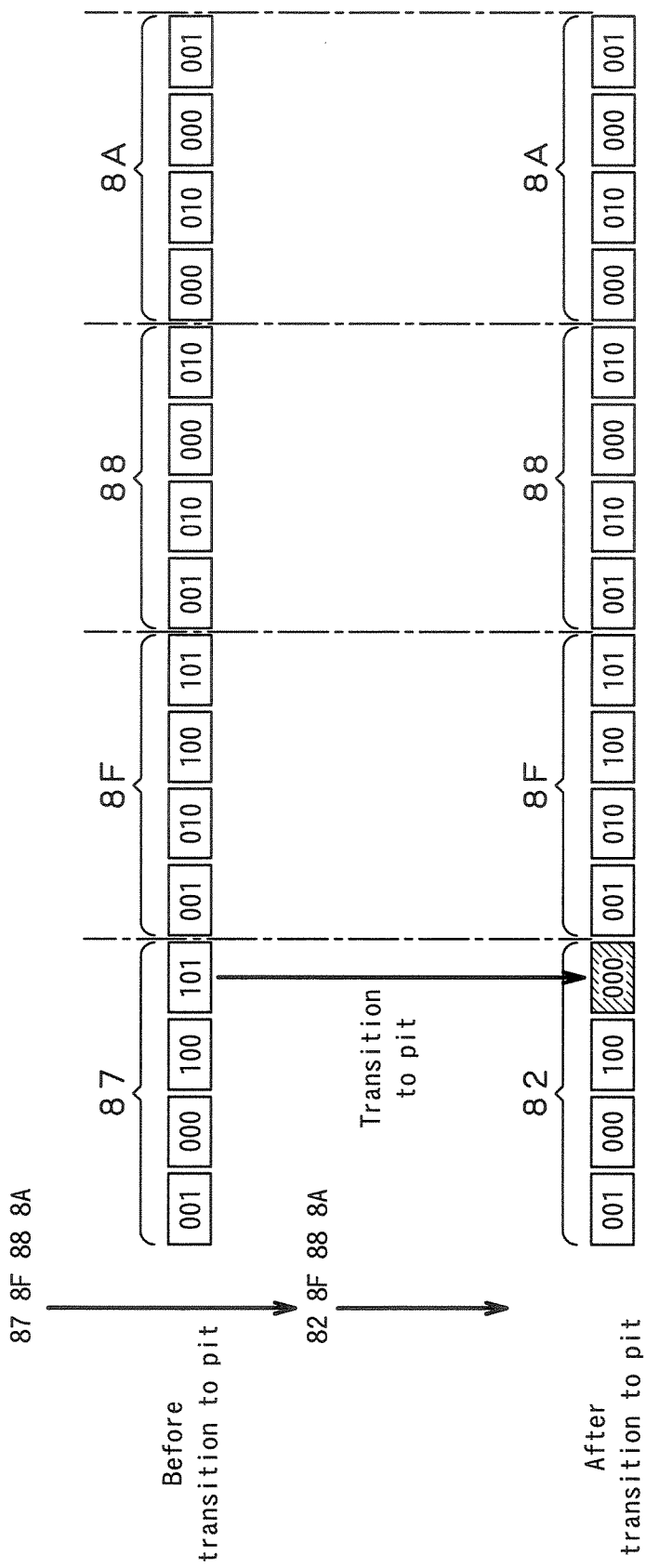
FIG. 29 explains forming a first bit in a 4-byte continuous area as a pit in another embodiment.
Figure 30:
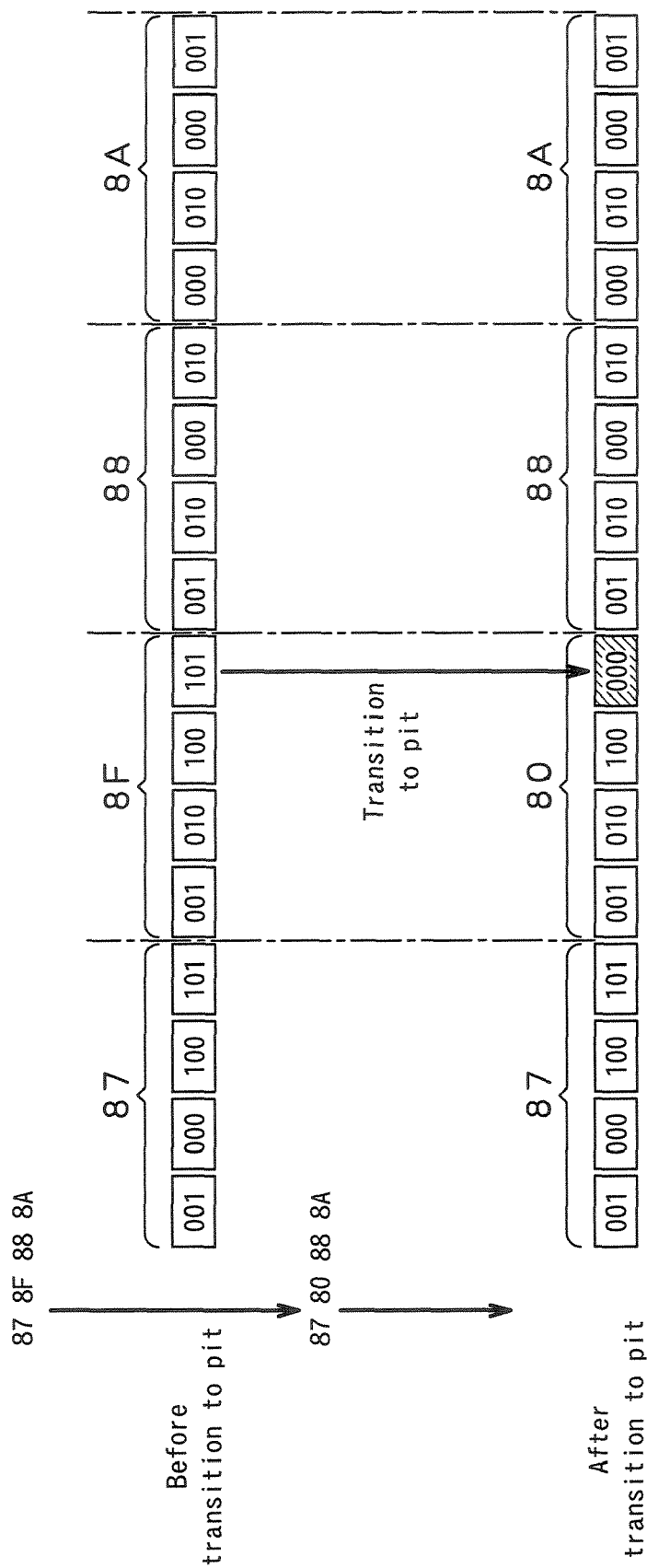
FIG. 30 explains forming a first bit in a 4-byte continuous area as a pit in another embodiment.

That is, as the result of the 17PP modulation, a pattern "101" will appear without fail at the end of the first byte (first 12 bits in a data row after 17PP-modulated) ail as shown in FIG. 29. The "101" pattern will be a pattern of 2T on the disc. When the 2T pattern is a land, a unique ID can be recorded on the pattern as a "specific land". Similarly, a "101" pattern will appear at the second byte (13th to 24th bit in the data row after 17PP-modulated) to form a 2T pattern as shown in FIG. 30.

A 2T pattern will appear at each of the first and second bytes. Since an odd number of "1" is inserted between the first and second bytes, the NRZI conversion results in a difference in polarity between the 2T pattern at the first byte and that at the second byte.

Therefore, one of the 2T patterns at the first and second bytes is necessarily a land as shown in FIGS. 33A and 33B. Thus, the 2T land necessarily existing at any one of the 2T patterns is irradiated with high-power laser light for transition to a pit. A pattern capable of maintaining a correct 17PP-modulated state even when it is transited to a land is selected for these 2T patterns. More specifically, the first byte is changed to data "82" while the second byte is changed to data "80".

Figure 31:
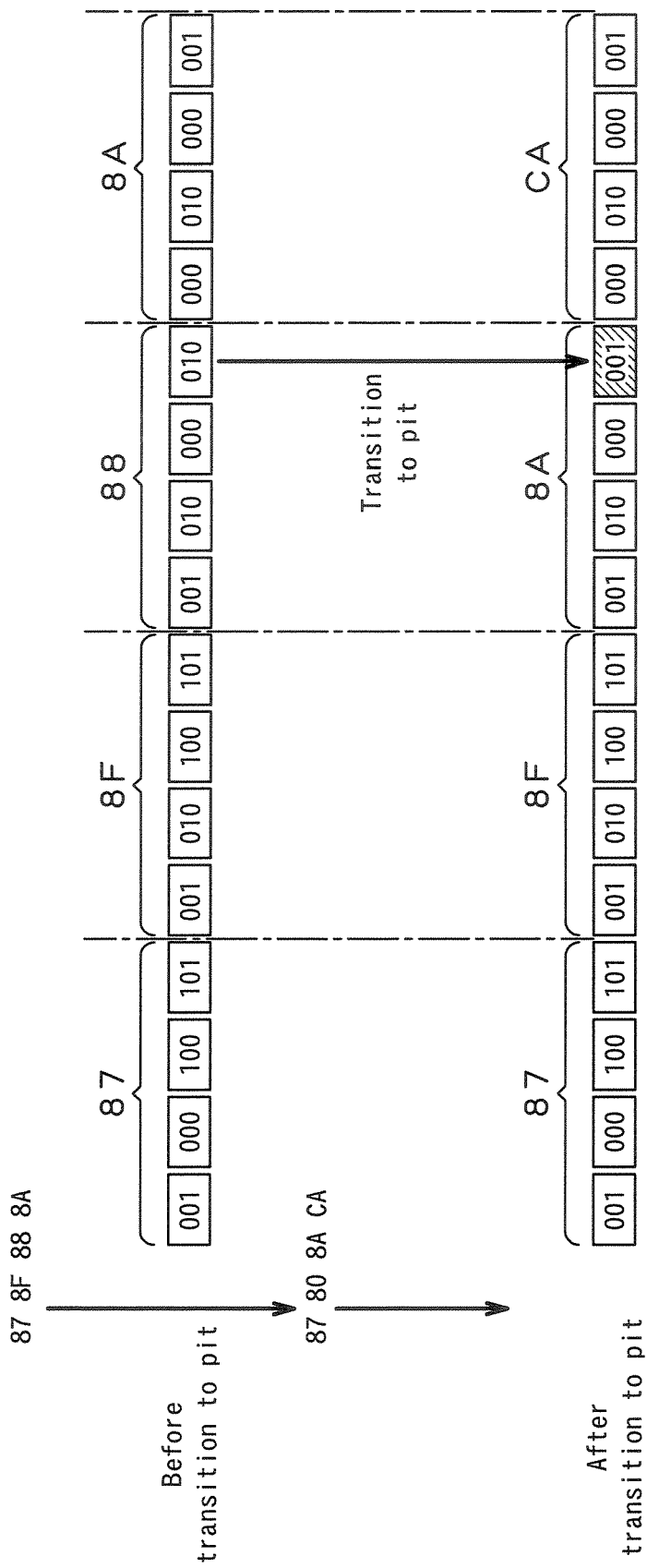
FIG. 31 explains forming a first bit in a 4-byte continuous area as a pit in a second variant of the embodiment in FIG. 30.
Figure 32:
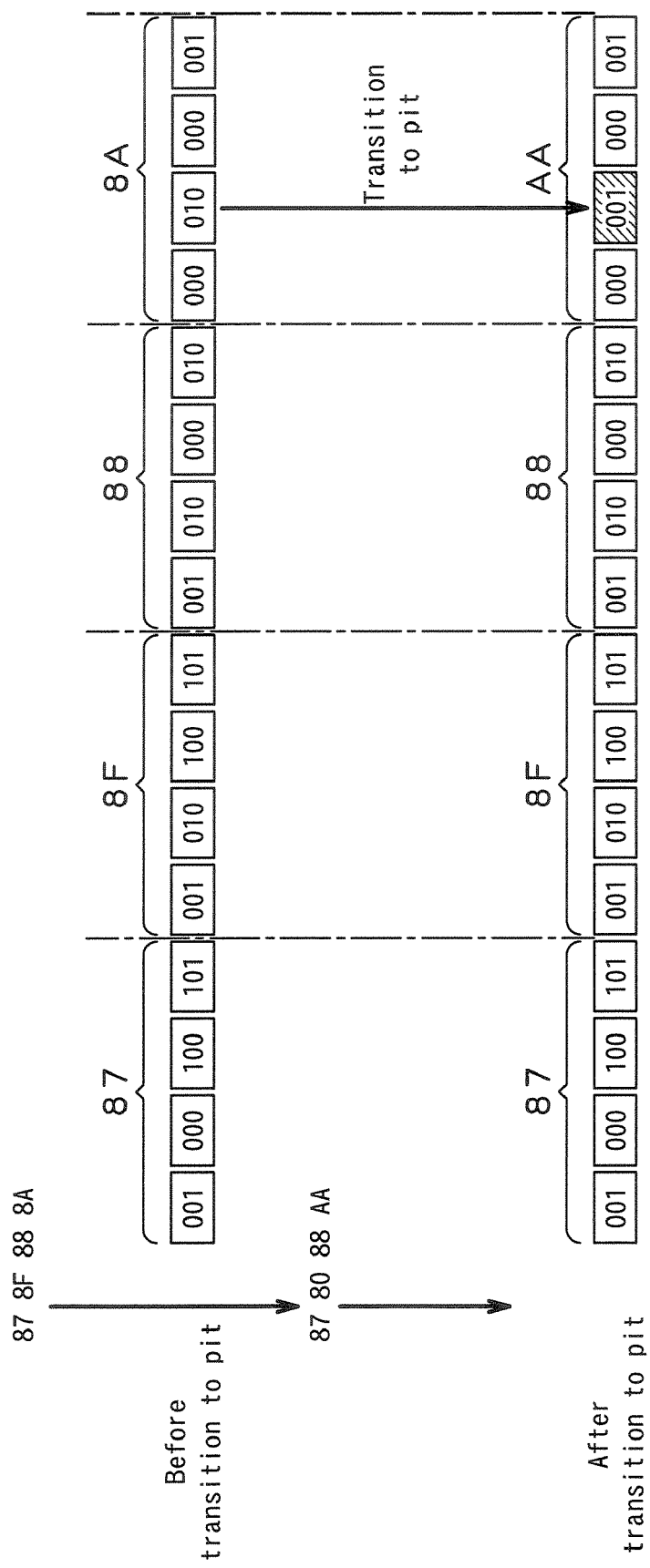
FIG. 32 explains forming a first bit in a 4-byte continuous area as a pit in another embodiment.

Also, at the third byte (25th to 36th bits in the data row after 17PP-modulated) and fourth byte (27th to 48th bits in the data row after 17PP-modulated), there are recorded selected patterns that will be decoded as a correct 17PP-modulated pattern even if the bit edge is shifted 1T as shown in FIGS. 31 and 32.

The third and fourth bytes are so configured that the polarity at a bit edge is different from that in a position 1T away from the bit edge. Therefore, the edge pattern of either the third or fourth byte is necessarily a land as shown in FIGS. 33A and 33B. More specifically, the third byte is changed to data "8A" while the fourth byte is changed to data "CA".

As above, four bytes (87, 8F, 88 and 8A) are used as base data, a unique ID can be recorded by transiting a 2T land and of shifting the pit-land boundary. This combination of two methods will contribute to easier designing and production of a player.

Effect and Applications

As having been described in the foregoing, according to the present invention, a unique ID for identification/management of each medium or title can be recorded on the optical disc 1 which is a read-only blue-ray disc (trademark) subjected to variable-length modulation such as 17PP modulation.

Also, in the aforementioned embodiments of the present invention, an identifier for each medium or title is recorded as the unique ID. However, control information used for playback of a program or content data varying from one disc to another may be recorded as the unique ID.

In case it is possible to play back a program or content data varying from one disc to another, the user can enjoy a game varying from one disc to another (if a game program is recorded in the disc). Also, in case a movie is recorded in an optical disc, the story of the movie can be changed to be different from one disc to another. Also it is possible to append a unique ID to an optical disc with the content of the unique ID being changed a little from one disc to another just before the shipment. For example, many optical discs massively produced at factory may be stocked, the name of a sales district to which the discs are to be shipped may be recorded on the discs, and the story ending of each movie or game can be changed from one disc to another.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

The invention claimed is:

1. An optical disc producing method of producing a read-only optical disc in which recording is made in units of a cluster including a row of recording-information bits and an error-correcting code, lands and pits are formed contiguously to each other along a recording track and a sequence of lands and pits complies with a predetermined variable-length modulation rule, the method comprising:
   a disc forming step of forming the read-only optical disc with the use of an optical disc master; and
   an identifier appending step of additionally writing a disc-unique identifier to a specific cluster on the read-only optical disc by irradiating laser light having a power higher than a reading power level to the lands to give the lands an optical property equal to that of the pits,
   in the identifier appending step, with continuous areas corresponding to bits of the identifier being preset in predetermined positions in the cluster, the lands included in each continuous area and located in positions where an entire bit row will comply with the variable-length modulation rule even if the lands are replaced with pits being changed by lasering corresponding to a value of each bit in the identifier appending step to have an optical property equal to that of the pits.

2. The method according to claim 1, wherein the variable-length modulation rule is such that NRZI modulation is made after 17PP (parity protection) modulation.

3. The method according to claim 1, wherein the continuous area is a continuous physical area of 4 bytes or more of a bit row not yet modulated.

4. The method according to claim 3, wherein the variable-length modulation rule is such that NRZI modulation is made after 17PP (parity protection) modulation, and
   the continuous area includes all the following land/pit patterns after being modulated
   3T pit-2T land-3T pit,
   3T land-2T pit-3T land,
   Pit of 4T or more-land of 4T or more, and
   Land of 4T or more-pit of 4T or more,
   where T is a modulation period.

5. The method according to claim 4, wherein the continuous area is such that 4-byte continuous data of the bit row not yet modulated is 87, 8F, 88, 8A in hexadecimal notation.

6. The method according to claim 1, wherein the cluster includes a frame sync of a predetermined bit pattern at each predetermined number of bytes in a modulated bit row, and the continuous area is provided after the frame sync.

7. The method according to claim 1, wherein the cluster includes a predetermined DC control bit at each predetermined number of bits in a modulated bit row, and between the continuous area and frame sync, there is included an even number of DC control bits.

8. The method according to claim 1, wherein in the identifier appending step, the continuous area is set in an area other than the error-correcting code in the cluster.

9. The method according to claim 8, wherein in the identifier appending step, the continuous area is set in an area other than an error-detecting code in the cluster.

10. The method according to claim 1, wherein in the identifier appending step, two continuous areas, first and second, are preset in predetermined positions in the cluster for each bit in the identifier, in case a bit value of the identifier is zero (0), a specific land included in the first continuous area corresponding to a bit position is transited to a pit by lasering, while in case the bit value of the identifier is one (1), a specific land included in the second continuous area corresponding to a bit position is transited to a pit by lasering.

11. The method according to claim 10, wherein the variable-length modulation rule includes 177PP (parity protection) modulation and NRZI modulation.

12. The method according to claim 10, wherein each of the first and second continuous areas is a continuous physical area of 4 bytes or more of a bit row not yet modulated.

13. A read-only optical disc comprising:
   a data structure in which a recording is made in units of a cluster including a row of recording-information bits and an error-correcting code; and lands and pits formed contiguously to each other along a recording track and a sequence of the lands and pits complies with a predetermined variable-length modulation rule, wherein, the disc includes a specific cluster having a disc-unique identifier additionally written thereto by irradiated laser light having a power higher than a reading power level to the lands in the cluster to give the lands a optical property equal to that of the pits, the specific cluster has preset in a predetermined position therein a continuous area corresponding to each bit of the identifier, and the continuous area has a bit value corresponding to the identifier recorded by lasering on the lands located in positions where an entire bit row will comply with the variable-length modulation rule even if the lands are replaced with pits.

14. The optical disc according to claim 13, wherein the variable-length modulation rule is such that NRZI modulation is made after 17PP (parity protection) modulation.

15. The optical disc according to claim 13, wherein the continuous area is a continuous physical area of 4 bytes or more of a bit row not yet modulated.

16. The optical disc according to claim 15, wherein the variable-length modulation rule is such that NRZI modulation is made after 17PP (parity protection) modulation, and
the continuous area includes all the following land/pit patterns after being modulated
3T pit-2T land-3T pit,
3T land-2T pit-3T land,
Pit of 4T or more-land of 4T or more, and
Land of 4T or more-pit of 4T or more,
where T is a modulation period.

17. The optical disc according to claim 16, wherein the continuous area is such that 4-byte continuous data of the bit row not yet modulated is 87, 8F, 88, 8A in hexadecimal notation.

18. The optical disc according to claim 13, wherein the cluster includes a frame sync of a predetermined bit pattern at each predetermined number of bytes in a modulated bit row, and the continuous area is provided after the frame sync.

19. The optical disc according to claim 13, wherein the cluster includes a predetermined DC control bit at each predetermined number of bits in a modulated bit row, and between the continuous area and frame sync, there is included an even number of DC control bits.

20. The optical disc according to claim 13, wherein continuous area is set in an area other than the error-correcting code in the cluster.

21. The optical disc according to claim 20, wherein the continuous area is set in an area other than an error-detecting code in the cluster.

22. The optical disc according to claim 13, wherein two continuous areas, first and second, are preset in predetermined positions in the cluster for each bit in the identifier, in case a bit value of the identifier is zero (0), a specific land included in the first continuous area corresponding to a bit position is transited to a pit by lasering, while in case the bit value of the identifier is one (1), a specific land included in the second continuous area corresponding to a bit position is transited to a pit by lasering.

23. The optical disc according to claim 22, wherein the variable-length modulation rule includes 177PP (parity protection) modulation and NRZI modulation, which are effected in this order.

24. The optical disc according to claim 22, wherein each of the first and second continuous areas is a continuous physical area of 4 bytes or more of a bit row not yet modulated.

25. An optical disc producing apparatus for producing a read-only optical disc in which recording is made in units of a cluster including a row of recording-information bits and an error-correcting code, lands and pits are formed contiguously to each other along a recording track and a sequence of lands and pits complies with a predetermined variable-length modulation rule, the apparatus comprising:
an identifier appending unit that writes a disc-unique identifier to a specific cluster on the read-only optical disc by irradiating laser light having a power higher than a reading power level to the lands to give the lands an optical property equal to that of the pits, the identifier appending unit presets continuous areas corresponding to bits of the identifier in predetermined positions in the cluster and changing lands included in each continuous area and located in positions where an entire bit row will comply with the variable-length modulation rule even if the lands are replaced with pits to have an optical property equal to that of the pits by lasering corresponding to a value of each bit in the identifier.

26. The apparatus according to claim 25, wherein the variable-length modulation rule is such that NRZI modulation is made after 17PP (parity protection) modulation.

27. The apparatus according to claim 25, wherein the continuous area is a continuous physical area of 4 bytes or more of a bit row not yet modulated.

28. The apparatus according to claim 27, wherein the variable-length modulation rule is such that NRZI modulation is made after 17PP (parity protection) modulation, and
the continuous area includes all the following land/pit patterns after being modulated
3T pit-2T land-3T pit,
3T land-2T pit-3T land,
Pit of 4T or more-land of 4T or more, and
Land of 4T or more-pit of 4T or more,
where T is a modulation period.

29. The apparatus according to claim 28, wherein the continuous area is such that 4-byte continuous data of the bit row not yet modulated is 87, 8F, 88, 8A in hexadecimal notation.

30. The apparatus according to claim 25, wherein the cluster includes a frame sync of a predetermined bit pattern at each predetermined number of bytes in a modulated bit row, and the continuous area is provided after the frame sync.

31. The apparatus according to claim 25, wherein the cluster includes a predetermined DC control bit at each predetermined number of bits in a modulated bit row, and between the continuous area and frame sync, there is included an even number of DC control bits.

32. The apparatus according to claim 25, wherein the continuous area is set in an area other than the error-correcting code in the cluster.

33. The apparatus according to claim 32, wherein the continuous area is set in an area other than an error-detecting code in the cluster.

34. The apparatus according to claim 25, wherein two continuous areas, first and second, are preset in predetermined positions in the cluster for each bit in the identifier, in case a bit value of the identifier is zero (0), a specific land included in the first continuous area corresponding to a bit position is transited to a pit by lasering, while in case the bit value of the identifier is one (1), a specific land included in the second continuous area corresponding to a bit position is transited to a pit by lasering.

35. The apparatus according to claim 34, wherein the variable-length modulation rule includes 177PP (parity protection) modulation and NRZI modulation, which are effected in this order.

36. The apparatus according to claim 34, wherein each of the first and second continuous areas is a continuous physical area of 4 bytes or more of a bit row not yet modulated.

37. An optical disc producing method of producing a read-only optical disc in which recording is made in units of a cluster including a row of recording-information bits and an error-correcting code, lands and pits are formed contiguously to each other along a recording track and a sequence of lands and pits complies with a predetermined variable-length modulation rule, the method comprising:
an information bit row forming step of forming a modulated bit row which is to be a land/pit pattern on the optical disc;
an identifier appending step of additionally writing an identifier to a specific cluster on the read-only optical disc by making pattern inversion to transit a predetermined land in the modulated bit row to a pit;
a disc master forming step of forming an optical disc master having the modulated bit row recorded therein after having the identifier additionally written; and
a disc forming step of forming the read-only optical disc with use of the optical disc master,
in the information bit row forming step, continuous areas corresponding to bits of the identifier being preset in predetermined positions in the cluster and lands included in each continuous area and located in positions where an entire bit row will comply with the variable-length modulation rule even if the lands are replaced with pits being changed by the pattern inversion corresponding to a value of each bit in the identifier to have an optical property equal to that of the pits.

38. The method according to claim 37, wherein the variable-length modulation rule includes 177PP (parity protection) modulation and NRZI modulation, which are effected in this order.

39. The method according to claim 37, wherein the continuous area is a continuous physical area of 4 bytes or more of a bit row not yet modulated.

40. The method according to claim 39, wherein the variable-length modulation rule is such that NRZI modulation is made after 17PP (parity protection) modulation, and
the continuous area includes all the following land/pit patterns after being modulated
3T pit-2T land-3T pit,
3T land-2T pit-3T land,
Pit of 4T or more-land of 4T or more,
Land of 4T or more-pit of 4T or more,
where T is a modulation period.

41. The method according to claim 40, wherein the continuous area is such that 4-byte continuous data of the bit row not yet modulated is 87, 8F, 88, 8A in hexadecimal notation.

42. The method according to claim 37, wherein the cluster includes a frame sync of a predetermined bit pattern at each predetermined number of bytes in the modulated bit row, and the continuous area is provided after the frame sync.

43. The method according to claim 37, wherein the cluster includes a predetermined DC control bit at each predetermined number of bits in the modulated bit row, and between the continuous area and frame sync, there is included an even number of DC control bits.

44. The method according to claim 37, wherein in the identifier appending step, the continuous area is set in an area other than the error-correcting code in the cluster.

45. The method according to claim 44, wherein in the identifier appending step, the continuous area is set in an area other than an error-detecting code in the cluster.

46. The method according to claim 37, wherein in the identifier appending step, two continuous areas, first and second, are preset in predetermined positions in the cluster for each bit in the identifier, in case a bit value of the identifier is zero (0), a specific land included in the first continuous area corresponding to a bit position is transited to a pit by the pattern inversion, while in case the bit value of the identifier is one (1), a specific land included in the second continuous area corresponding to the bit position is transited to a pit by the pattern inversion.

47. The method according to claim 46, wherein the variable-length modulation rule includes 177PP (parity protection) modulation and NRZI modulation, which are effected in this order.

48. The method according to claim 46, wherein each of the first and second continuous areas is a continuous physical area of 4 bytes or more of a bit row not yet modulated.

49. A read-only optical disc comprising:
a data structure in which recording is made in units of a cluster including a row of recording-information bits and an error-correcting code,
lands and pits formed contiguously to each other along a recording track and a sequence of the lands and pits complies with a predetermined variable-length modulation rule, wherein,
the disc includes a specific cluster having a disc-unique identifier additionally written thereto after having a land/pit pattern formed thereon by modulating an arbitrary information bit row and error-correcting code for the bit row,
the specific cluster has preset in a predetermined position therein a continuous area corresponding to each bit of the identifier, and
the disc-unique identifier is appended to the continuous area by transiting, to pits, the lands located in positions where an entire bit row will comply with the variable-length modulation rule even if the lands are replaced with pits.

50. The optical disc according to claim 49, wherein the variable-length modulation rule includes 177PP (parity protection) modulation and NRZI modulation, which are effected in this order.

51. The optical disc according to claim 49, wherein the continuous area is a continuous physical area of 4 bytes or more of a bit row not yet modulated.

52. The optical disc according to claim 51, wherein the variable-length modulation rule is such that the NRZI modulation is made after the 17PP (parity protection) modulation, and the continuous area includes all the following land/pit patterns after being modulated
3T pit-2T land-3T pit,
3T land-2T pit-3T land,
Pit of 4T or more-land of 4T or more, and
Land of 4T or more-pit of 4T or more,
where T is a modulation period.

53. The optical disc according to claim 52, wherein the continuous area is such that 4-byte continuous data of the bit row not yet modulated is 87, 8F, 88, 8A in hexadecimal notation.

54. The optical disc according to claim 49, wherein the cluster includes a frame sync of a predetermined bit pattern at each predetermined number of bytes in the modulated bit row, and the continuous area is provided after the frame sync.

55. The optical disc according to claim 54, wherein the cluster includes a predetermined DC control bit at each predetermined number of bits in the modulated bit row, and between the continuous area and frame sync, there is included an even number of DC control bits.

56. The optical disc according to claim 49, wherein the continuous area is set in an area other than the error-correcting code in the cluster.

57. The optical disc according to claim 56, wherein the continuous area is set in an area other than an error-detecting code in the cluster.

58. The optical disc according to claim 49, wherein two continuous areas, first and second, are preset in predetermined positions in the cluster for each bit in the identifier, a bit value of the identifier is zero (0) in case a specific land included in the first continuous area is transited to a pit, and the bit value of the identifier is one (1) in case a specific land included in the second continuous area corresponding to a bit position is transited to a pit.

59. The optical disc according to claim 58, wherein the variable-length modulation rule includes 177PP (parity protection) modulation and NRZI modulation, which are effected in this order.

60. The optical disc according to claim 58, wherein each of the first and second continuous areas is a continuous physical area of 4 bytes or more of a bit row not yet modulated.

61. An optical disc producing apparatus for producing a read-only optical disc in which recording is made in units of a cluster including a row of recording-information bits and an error-correcting code, lands and pits are formed contiguously to each other along a recording track and a sequence of lands and pits complies with a predetermined variable-length modulation rule, the apparatus comprising:
an identifier appending unit that is supplied with a modulated bit row that will be a land/pit pattern on the read-only optical disc and additionally writes an identifier to a specific cluster on the read-only optical disc by transiting a specific land of the modulated bit row to a pit,
the identifier appending unit presets continuous areas corresponding to bits of the identifier being preset in predetermined positions in the cluster and transiting, to pits by the pattern conversion corresponding to a value of each bit in the identifier, lands included in each continuous area and located in positions where an entire bit row will comply with the variable-length modulation rule even if the lands are replaced with pits.

62. The method according to claim 61, wherein the variable-length modulation rule includes 177PP (parity protection) modulation and NRZI modulation, which are effected in this order.

63. The method according to claim 61, wherein the continuous area is a continuous physical area of 4 bytes or more of the bit row not yet modulated.

64. The method according to claim 63, wherein the variable-length modulation rule is such that NRZI modulation is made after 17PP (parity protection) modulation, and
the continuous area includes all the following land/pit patterns after being modulated
3T pit-2T land-3T pit,
3T land-2T pit-3T land,
Pit of 4T or more-land of 4T or more, and
Land of 4T or more-pit of 4T or more,
where T is a modulation period.

65. The method according to claim 64, wherein the continuous area is such that 4-byte continuous data of the bit row not yet modulated is 87, 8F, 88, 8A in hexadecimal notation.

66. The method according to claim 64, wherein the continuous area is set in an area other than the error-correcting code in the cluster.

67. The method according to claim 66, wherein the continuous area is set in an area other than an error-detecting code in the cluster.

68. The method according to claim 64, wherein two continuous areas, first and second, are preset in predetermined positions in the cluster for each bit in the identifier, in case a bit value of the identifier is zero (0), a specific land included in the first continuous area corresponding to a bit position is transited to a pit by pattern inversion, while in case the bit value of the identifier is one (1), a specific land included in the second continuous area corresponding to the bit position is transited to a pit by pattern inversion.

69. The method according to claim 68, wherein the variable-length modulation rule includes the 177PP (parity protection) modulation and NRZI modulation, which are effected in this order.

70. The method according to claim 68, wherein each of the first and second continuous areas is a continuous physical area of 4 bytes or more of a bit row not yet modulated.

71. The method according to claim 61, wherein the cluster includes a frame sync of a predetermined bit pattern at each predetermined number of bytes in the modulated bit row, and the continuous area is provided after the frame sync.

72. The method according to claim 71, wherein the cluster includes a predetermined DC control bit at each predetermined number of bits in the modulated bit row, and between the continuous area and the frame sync, there is included an even number of DC control bits.

* * * * *